(12) United States Patent
Rothkopf et al.

(10) Patent No.: US 12,147,607 B1
(45) Date of Patent: Nov. 19, 2024

(54) TRANSITIONING BETWEEN ENVIRONMENTS

(71) Applicant: Apple Inc., Cupertino, CA (US)

(72) Inventors: Fletcher R. Rothkopf, Los Altos, CA (US); Arlen Hartounian, San Jose, CA (US); Grant H. Mulliken, San Jose, CA (US); James William Charles Vandyke, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/924,623

(22) Filed: Jul. 9, 2020

Related U.S. Application Data

(60) Provisional application No. 62/873,120, filed on Jul. 11, 2019.

(51) Int. Cl.
| | | |
|---|---|---|
| *G06F 3/01* | (2006.01) | |
| *G02B 27/01* | (2006.01) | |
| *G06F 3/16* | (2006.01) | |
| *G06T 19/00* | (2011.01) | |

(52) U.S. Cl.
CPC ......... *G06F 3/017* (2013.01); *G02B 27/0101* (2013.01); *G02B 27/0172* (2013.01); *G06F 3/011* (2013.01); *G06F 3/167* (2013.01); *G06T 19/006* (2013.01); *G02B 2027/0138* (2013.01); *G06T 2219/2016* (2013.01)

(58) Field of Classification Search
CPC ......... G06F 3/011; G06F 3/017; G06F 3/167; G06T 19/006; G06T 2219/2016; G02B 27/0101; G02B 27/0172; G02B 2027/0138

See application file for complete search history.

(56) References Cited

U.S. PATENT DOCUMENTS

| | | | | |
|---|---|---|---|---|
| 9,223,408 | B2 * | 12/2015 | McArdle | G06F 3/017 |
| 9,741,169 | B1 * | 8/2017 | Holz | G02B 27/0172 |
| 9,826,299 | B1 * | 11/2017 | Osterhout | G06F 3/03545 |
| 10,127,290 | B1 * | 11/2018 | Armstrong | G06F 3/04845 |
| 10,339,721 | B1 * | 7/2019 | Dascola | G06F 3/0486 |
| 10,409,363 | B1 * | 9/2019 | Kudirka | A63B 71/0622 |
| 2002/0190989 | A1 | 12/2002 | Kamata et al. | |
| 2006/0105838 | A1 | 5/2006 | Mullen | |

(Continued)

FOREIGN PATENT DOCUMENTS

| | | | |
|---|---|---|---|
| CA | 3039347 A1 * | 4/2018 | G06F 3/01 |
| CN | 103810360 A | 5/2014 | |

(Continued)

OTHER PUBLICATIONS

International Preliminary Report on Patentability received for PCT Patent Application No. PCT/US2019/050008, mailed on Mar. 18, 2021, 11 pages.

(Continued)

*Primary Examiner* — Ryan R Yang
(74) *Attorney, Agent, or Firm* — DLA Piper LLP (US)

(57) ABSTRACT

In accordance with some embodiments, exemplary techniques for transitioning from the physical environment to a computer-generated reality environment on a wearable electronic device is described. In accordance with some embodiments, exemplary techniques for transitioning out of a computer-generated reality environment on a wearable electronic device is described.

25 Claims, 13 Drawing Sheets

(56) References Cited

U.S. PATENT DOCUMENTS

| | | | | |
|---|---|---|---|---|
| 2010/0005406 | A1* | 1/2010 | Hathaway | G06F 3/0481 |
| | | | | 715/764 |
| 2012/0058801 | A1* | 3/2012 | Nurmi | G06F 3/011 |
| | | | | 455/566 |
| 2012/0154425 | A1 | 6/2012 | Kim | |
| 2013/0328927 | A1 | 12/2013 | Mount et al. | |
| 2014/0364212 | A1 | 12/2014 | Osman et al. | |
| 2016/0062121 | A1* | 3/2016 | Border | G02B 30/34 |
| | | | | 359/630 |
| 2016/0247306 | A1 | 8/2016 | Jang et al. | |
| 2016/0260261 | A1* | 9/2016 | Hsu | B23K 9/173 |
| 2016/0260441 | A1 | 9/2016 | Muehlhausen et al. | |
| 2016/0313790 | A1 | 10/2016 | Clement et al. | |
| 2017/0153866 | A1 | 6/2017 | Grinberg et al. | |
| 2017/0256083 | A1 | 9/2017 | Ikeuchi et al. | |
| 2017/0278304 | A1 | 9/2017 | Hildreth et al. | |
| 2017/0294030 | A1 | 10/2017 | Coglitore | |
| 2018/0005441 | A1* | 1/2018 | Anderson | A63F 13/655 |
| 2018/0012074 | A1 | 1/2018 | Holz et al. | |
| 2018/0053351 | A1* | 2/2018 | Anderson | G06F 3/011 |
| 2018/0130260 | A1* | 5/2018 | Schmirler | G06T 19/006 |
| 2019/0035124 | A1 | 1/2019 | Kapinos et al. | |
| 2019/0064919 | A1* | 2/2019 | Bastide | A61B 5/165 |
| 2019/0134487 | A1* | 5/2019 | Kudirka | G06F 3/011 |
| 2019/0146219 | A1* | 5/2019 | Rodriguez, II | G06F 3/0482 |
| | | | | 345/633 |
| 2020/0035025 | A1* | 1/2020 | Crocker | G06T 19/006 |
| 2020/0211295 | A1* | 7/2020 | Skidmore | G06F 3/016 |
| 2020/0286301 | A1* | 9/2020 | Loper | G06T 7/80 |
| 2021/0027523 | A1 | 1/2021 | Ichikawa et al. | |
| 2021/0102820 | A1* | 4/2021 | Le | G01C 21/3647 |
| 2021/0174601 | A1* | 6/2021 | Ohashi | G06F 3/014 |
| 2021/0192802 | A1 | 6/2021 | Nepveu et al. | |
| 2021/0352255 | A1 | 11/2021 | Nepveu et al. | |
| 2023/0386095 | A1 | 11/2023 | Nepveu et al. | |

FOREIGN PATENT DOCUMENTS

| | | | | |
|---|---|---|---|---|
| CN | 106227329 A | * | 12/2016 | G06T 19/006 |
| CN | 106249900 A | | 12/2016 | |
| EP | 3281058 A1 | | 2/2018 | |
| IN | 202117008387 A | | 4/2021 | |
| JP | 2017182809 A | * | 10/2017 | G02B 27/017 |
| JP | 2018147497 A | * | 9/2018 | G06F 3/01 |
| JP | 2018205828 A | * | 12/2018 | G06T 19/00 |
| KR | 20190051779 A | * | 5/2019 | A63F 9/10 |
| TW | 1601054 B | * | 10/2017 | G06F 3/048 |
| WO | 2016/039301 A1 | | 3/2016 | |
| WO | WO 2019101207 A1 | * | 5/2019 | G06F 3/011 |

OTHER PUBLICATIONS

International Preliminary Report on Patentability received for PCT Patent Application No. PCT/US2019/050032, mailed on Mar. 18, 2021, 17 pages.
International Search Report and Written Opinion received for PCT Patent Application No. PCT/US2019/050008, mailed on Jan. 7, 2020, 13 pages.
International Search Report and Written Opinion received for PCT Patent Application No. PCT/US2019/050032, mailed on May 18, 2020, 21 pages.
Invitation to Pay Additional Fees received for PCT Patent Application No. PCT/US2019/050032, mailed on Jan. 7, 2020, 13 pages.
Office Action received for Indian Patent Application No. 202117008387, mailed on Feb. 3, 2022, 11 pages.
Non-Final Office Action received for U.S. Appl. No. 17/272,251, mailed on Mar. 2, 2022, 24 pages.
Applicant-Initiated Interview Summary received for U.S. Appl. No. 17/272,251, mailed on Apr. 29, 2022, 4 pages.
Applicant-Initiated Interview Summary received for U.S. Appl. No. 17/272,251, mailed on Aug. 22, 2022, 3 pages.
Final Office Action received for U.S. Appl. No. 17/272,251, mailed on Jun. 23, 2022, 27 pages.
Non-Final Office Action received for U.S. Appl. No. 17/272,251, mailed on Oct. 13, 2022, 30 pages.
Sweetwater, "Crossfade", Available online at: https://www.sweetwater.com/insync/crossfade/, Oct. 29, 1997, 1 page.
Applicant-Initiated Interview Summary received for U.S. Appl. No. 17/272,251, mailed on Dec. 29, 2022, 4 pages.
Non-Final Office Action received for U.S. Appl. No. 17/272,025, mailed on Jul. 24, 2023, 26 pages.
Corrected Notice of Allowance received for U.S. Appl. No. 17/272,251, mailed on Feb. 8, 2023, 3 pages.
Notice of Allowance received for U.S. Appl. No. 17/272,251, mailed on Jan. 26, 2023, 11 pages.
Notice of Allowance received for U.S. Appl. No. 17/272,251, mailed on May 8, 2023, 8 pages.
Awe, "Bertrand Nepveu (VRvana): Creating Content that Blends AR & VR (Lessons Learned)", Available online at: https://www.youtube.com/watch?v=Gudj3-09rYQ, Jun. 9, 2017, 2 pages.
Colaner Seth, "The Best Mixed Reality We've Ever Seen (In a Casino Hallway): Vrvana Totem", Available online at: https://www.tomshardware.com/news/vrvana-totem-mixed-reality-ces,33348.html, Jan. 6, 2017, 12 pages.
Corrected Notice of Allowance received for U.S. Appl. No. 17/272,251, mailed on Sep. 18, 2023, 7 pages.
Final Office Action received for U.S. Appl. No. 17/272,025, mailed on Oct. 16, 2023, 22 pages.
Office Action received for Chinese Patent Application No. 201980056533.2, mailed on Dec. 15, 2023, 26 pages (14 pages of English Translation and 12 pages of Official Copy).
Notice of Allowance received for U.S. Appl. No. 17/272,025, mailed on Nov. 20, 2023, 10 pages.
Office Action received for Chinese Patent Application No. 201980056901.3, mailed on Dec. 5, 2023, 18 pages (9 pages of English Translation and 9 pages of Official Copy).
Notice of Allowance received for U.S. Appl. No. 18/233,653, mailed on Mar. 28, 2024, 10 pages.
Office Action received for Chinese Patent Application No. 201980056901.3, mailed on May 15, 2024, 11 pages (6 pages of English Translation and 5 pages of Official Copy).
Notice of Allowance received for U.S. Appl. No. 18/233,653, mailed on Jun. 21, 2024, 10 pages.
Office Action received for Indian Patent Application No. 202218036860, mailed on Jun. 24, 2024, 11 pages.

* cited by examiner

TRANSITIONING BETWEEN ENVIRONMENTS

CROSS-REFERENCE TO RELATED APPLICATIONS

This application claims priority to U.S. Provisional Application No. 62/873,120, filed Jul. 11, 2019, entitled "TRANSITIONING BETWEEN PHYSICAL AND COMPUTER-GENERATED REALITY ENVIRONMENTS." The entire contents of which are hereby incorporated by reference.

FIELD

The present disclosure relates generally to computer-generated reality environments, and more specifically to methods and techniques for transitioning between a physical environment and a computer-generated reality environment.

BACKGROUND

A user may wear a head-mounted device to experience a computer-generated reality environment. The transition from the physical environment to a computer-generated reality environment, however, can be abrupt. The change back to the physical environment as the user leaves the computer-generated reality environment also can be abrupt.

BRIEF SUMMARY

Embodiments described herein provide a user using a wearable electronic device, such as a head-mounted device, a smoother transition from the physical environment to the computer-generated reality environment and back to the physical environment.

In accordance with some embodiments, a method performed at a wearable electronic device that includes a display and one or more sensors is described. The method comprises: displaying, on the display, a video representation of a physical environment; detecting, using the one or more sensors, a movement of the wearable electronic device from a first orientation to a second orientation that is different from the first orientation; in response to detecting the movement of the wearable electronic device from the first orientation to the second orientation, in accordance with a determination that the detected movement satisfies a trigger criterion: displaying, on the display, a transition from the video representation of the physical environment to a computer-generated reality environment, wherein the transition is at least in part based on context data detected from the physical environment.

In accordance with some embodiments, a non-transitory computer-readable storage medium storing one or more programs configured to be executed by one or more processors of a wearable electronic device including a display and one or more sensors is described. The one or more programs include instructions for: displaying, on the display, a video representation of a physical environment; detecting, using the one or more sensors, a movement of the wearable electronic device from a first orientation to a second orientation that is different from the first orientation; in response to detecting the movement of the wearable electronic device from the first orientation to the second orientation, in accordance with a determination that the detected movement satisfies a trigger criterion: displaying, on the display, a transition from the video representation of the physical environment to a computer-generated reality environment, wherein the transition is at least in part based on context data detected from the physical environment.

In accordance with some embodiments, a transitory computer-readable storage medium storing one or more programs configured to be executed by one or more processors of a wearable electronic device including a display and one or more sensors is described. The one or more programs include instructions for: displaying, on the display, a video representation of a physical environment; detecting, using the one or more sensors, a movement of the wearable electronic device from a first orientation to a second orientation that is different from the first orientation; in response to detecting the movement of the wearable electronic device from the first orientation to the second orientation, in accordance with a determination that the detected movement satisfies a trigger criterion: displaying, on the display, a transition from the video representation of the physical environment to a computer-generated reality environment, wherein the transition is at least in part based on context data detected from the physical environment.

In accordance with some embodiments, a wearable electronic device comprising a display, one or more sensors, one or more processors, and memory storing one or more programs configured to be executed by the one or more processors is described. The one or more programs include instructions for: displaying, on the display, a video representation of a physical environment; detecting, using the one or more sensors, a movement of the wearable electronic device from a first orientation to a second orientation that is different from the first orientation; in response to detecting the movement of the wearable electronic device from the first orientation to the second orientation, in accordance with a determination that the detected movement satisfies a trigger criterion: displaying, on the display, a transition from the video representation of the physical environment to a computer-generated reality environment, wherein the transition is at least in part based on context data detected from the physical environment.

In accordance with some embodiments, a wearable electronic device is described. The wearable electronic device comprises: a display; one or more sensors means for displaying, on the display, a video representation of a physical environment; means for detecting, using the one or more sensors, a movement of the wearable electronic device from a first orientation to a second orientation that is different from the first orientation; means, in response to detecting the movement of the wearable electronic device from the first orientation to the second orientation, for, in accordance with a determination that the detected movement satisfies a trigger criterion: displaying, on the display, a transition from the video representation of the physical environment to a computer-generated reality environment, wherein the transition is at least in part based on context data detected from the physical environment.

In accordance with some embodiments, a method performed at a wearable electronic device including a display and one or more sensors is described. The method comprises: displaying, on the display, a computer-generated reality environment; while displaying the computer-generated reality environment: detecting, using the one or more sensors, a trigger event; and detecting, using the one or more sensors, context data from a physical environment; and displaying, on the display, a transition from the computer-generated reality environment to a video representation of the physical environment, wherein the transition is at least in part based on the context data detected from the physical environment.

In accordance with some embodiments, a non-transitory computer-readable storage medium storing one or more programs configured to be executed by one or more processors of a wearable electronic device including a display and one or more sensors is described. The one or more programs include instructions for: displaying, on the display, a computer-generated reality environment; while displaying the computer-generated reality environment: detecting, using the one or more sensors, a trigger event; and detecting, using the one or more sensors, context data from a physical environment; and displaying, on the display, a transition from the computer-generated reality environment to a video representation of the physical environment, wherein the transition is at least in part based on the context data detected from the physical environment.

In accordance with some embodiments, a transitory computer-readable storage medium storing one or more programs configured to be executed by one or more processors of a wearable electronic device including a display and one or more sensors is described. The one or more programs include instructions for: displaying, on the display, a computer-generated reality environment; while displaying the computer-generated reality environment: detecting, using the one or more sensors, a trigger event; and detecting, using the one or more sensors, context data from a physical environment; and displaying, on the display, a transition from the computer-generated reality environment to a video representation of the physical environment, wherein the transition is at least in part based on the context data detected from the physical environment.

In accordance with some embodiments, a wearable electronic device comprising a display, one or more sensors, one or more processors, and memory storing one or more programs configured to be executed by the one or more processors is described. The one or more programs include instructions for: displaying, on the display, a computer-generated reality environment; while displaying the computer-generated reality environment: detecting, using the one or more sensors, a trigger event; and detecting, using the one or more sensors, context data from a physical environment; and displaying, on the display, a transition from the computer-generated reality environment to a video representation of the physical environment, wherein the transition is at least in part based on the context data detected from the physical environment.

In accordance with some embodiments, a wearable electronic device is described. The wearable electronic device comprises: a display; one or more sensors; means for displaying, on the display, a computer-generated reality environment; means, while displaying the computer-generated reality environment, for: detecting, using the one or more sensors, a trigger event; and detecting, using the one or more sensors, context data from a physical environment; and means for displaying, on the display, a transition from the computer-generated reality environment to a video representation of the physical environment, wherein the transition is at least in part based on the context data detected from the physical environment.

BRIEF DESCRIPTION OF THE FIGURES

For a better understanding of the various described embodiments, reference should be made to the Detailed Description below, in conjunction with the following drawings in which like reference numerals refer to corresponding parts throughout the figures.

DETAILED DESCRIPTION

Figure 1A:
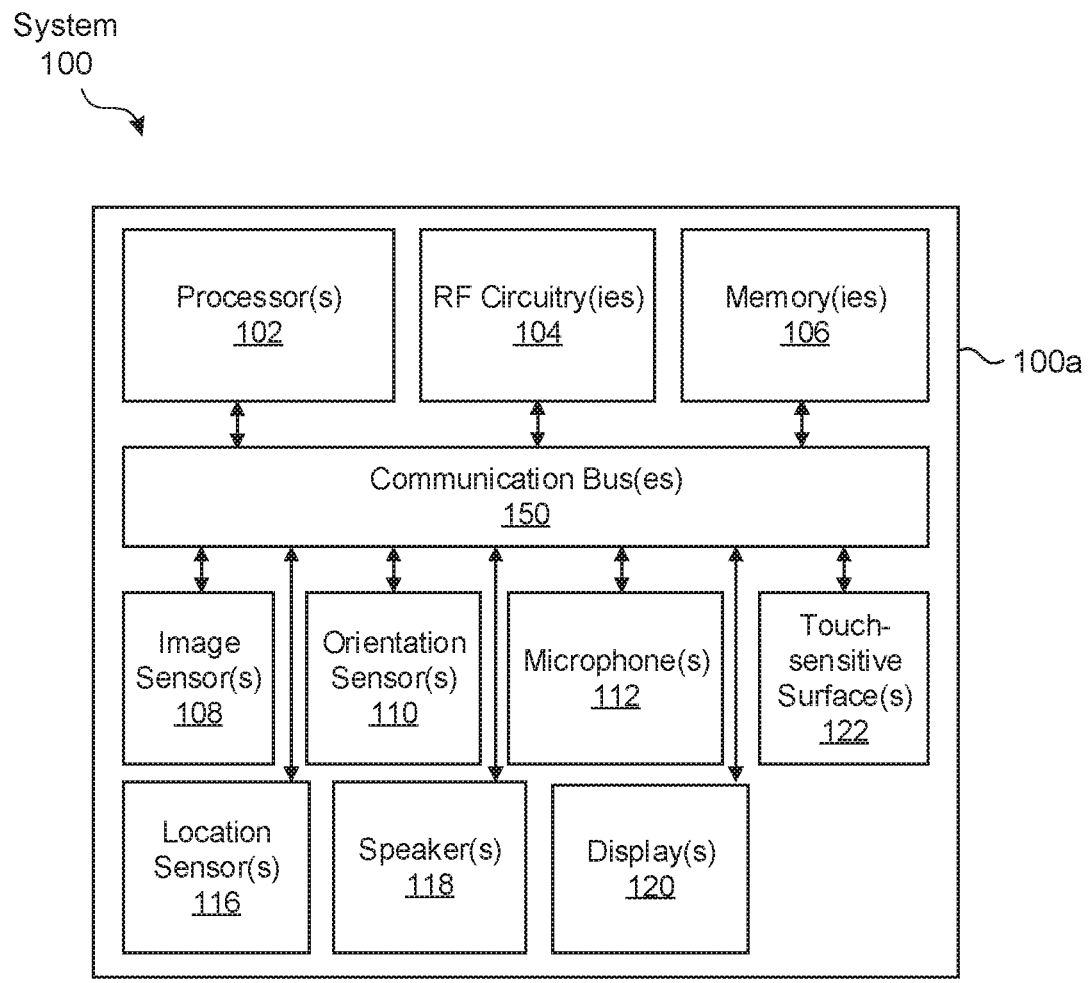
FIGS. 1A-1B illustrate exemplary systems for use in various computer-generated reality technologies.

Various examples of electronic systems and techniques for using such systems in relation to various computer-generated reality technologies are described.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one example, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
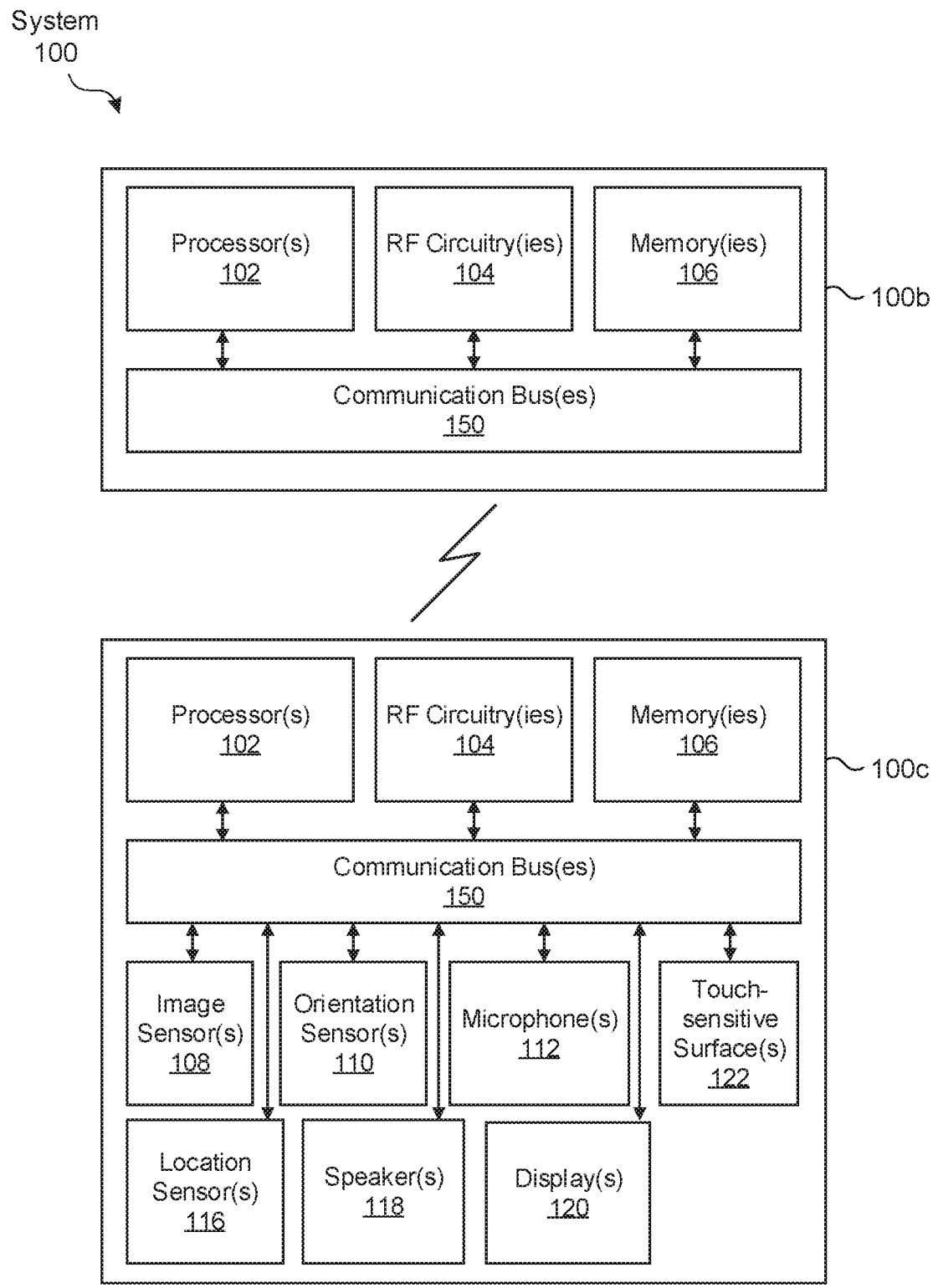

FIG. 1A and FIG. 1B depict exemplary system 100 for use in various computer-generated reality technologies.

In some examples, as illustrated in FIG. 1A, system 100 includes device 100*a*. Device 100*a* includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*a*.

In some examples, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some examples, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some examples, system 100 is a mobile device. In some examples, system 100 is a head-mounted display (HMD) device. In some examples, system 100 is a wearable HUD device.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some examples, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

FIGS. 2A-2I illustrate exemplary techniques for transitioning from the physical environment to a computer-generated reality environment on an electronic device 204. In some embodiments, electronic device 204 is a wearable electronic device (e.g., a head-mounted device). In some embodiments, electronic device 204 is similar to electronic device 100a described above with reference to FIGS. 1A and 1B.

Figure 2A:
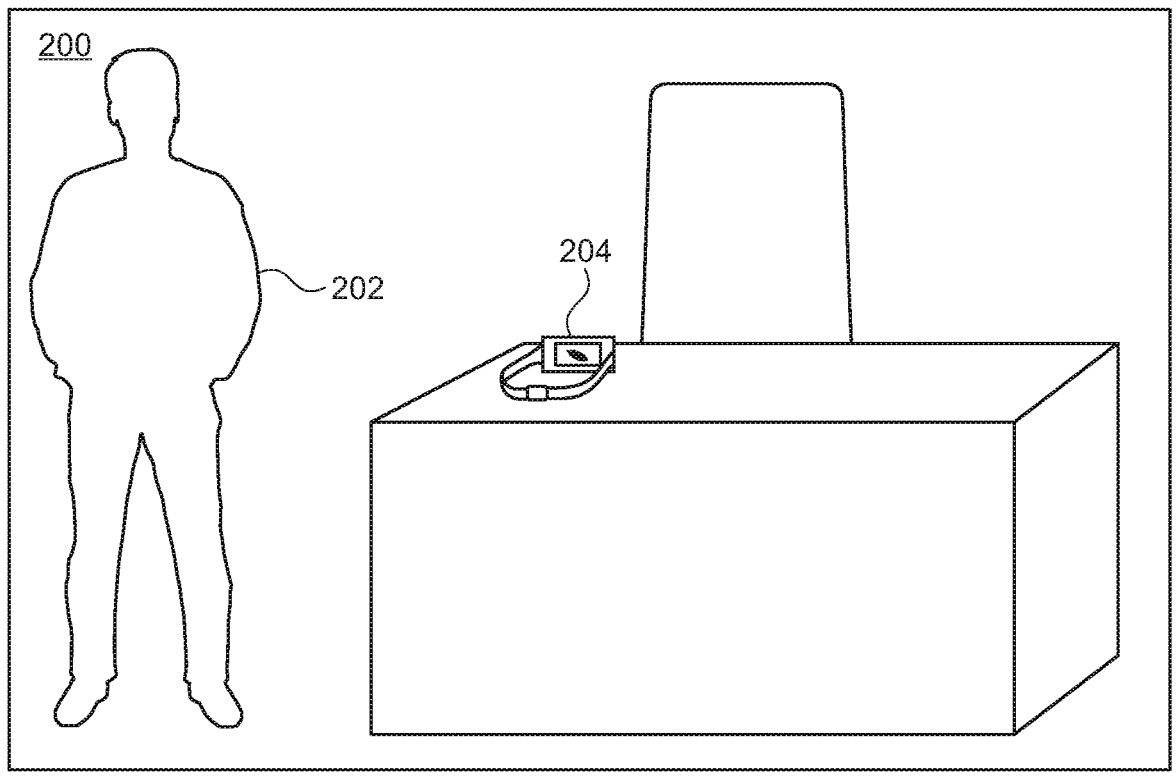
FIGS. 2A-2I illustrate exemplary techniques for transitioning from the physical environment to a computer-generated reality environment on a wearable electronic device, in accordance with some embodiments.

FIG. 2A illustrates a user 202 in a physical environment 200 (e.g., an office) near electronic device 204. In FIG. 2A, electronic device 204 is in a first orientation (e.g., a first position, a first location, and/or a first placement of electronic device 204 within physical environment 200) that does not correspond to the user wearing or otherwise using electronic device 204. In other words, user 202 is not wearing electronic device 204 while electronic device 204 is in the first orientation.

Figure 2B:
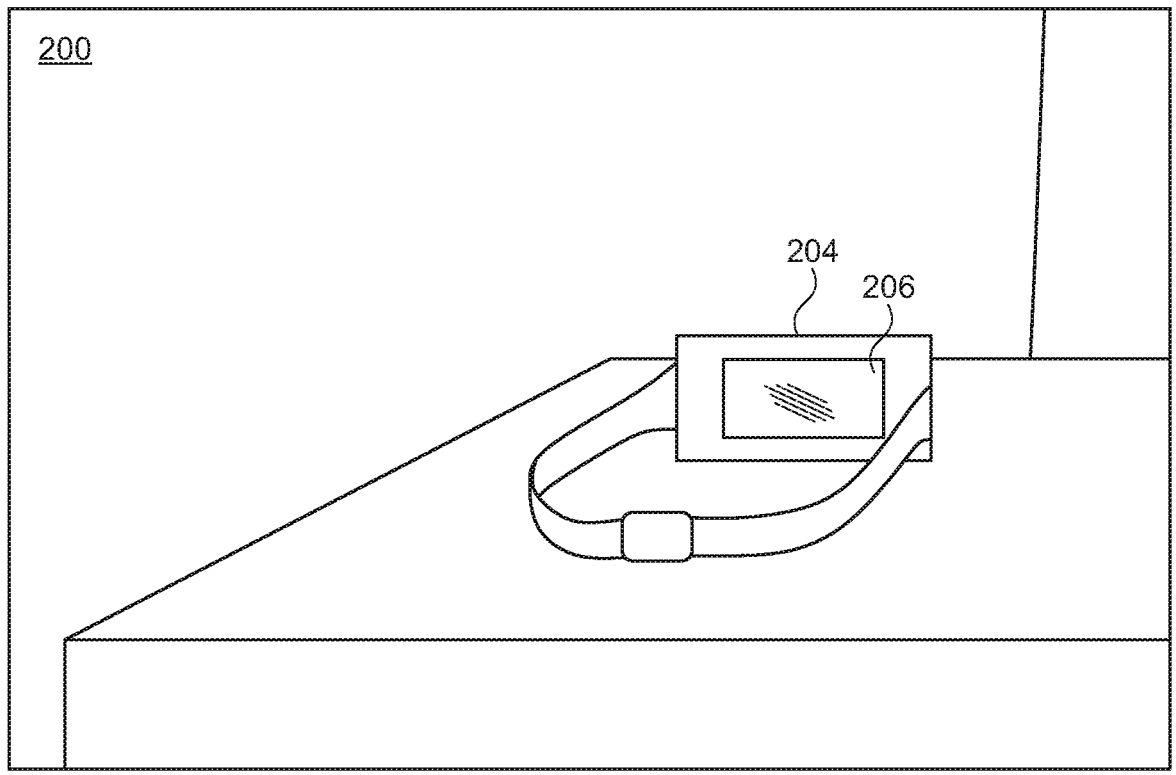
Figure 2C:
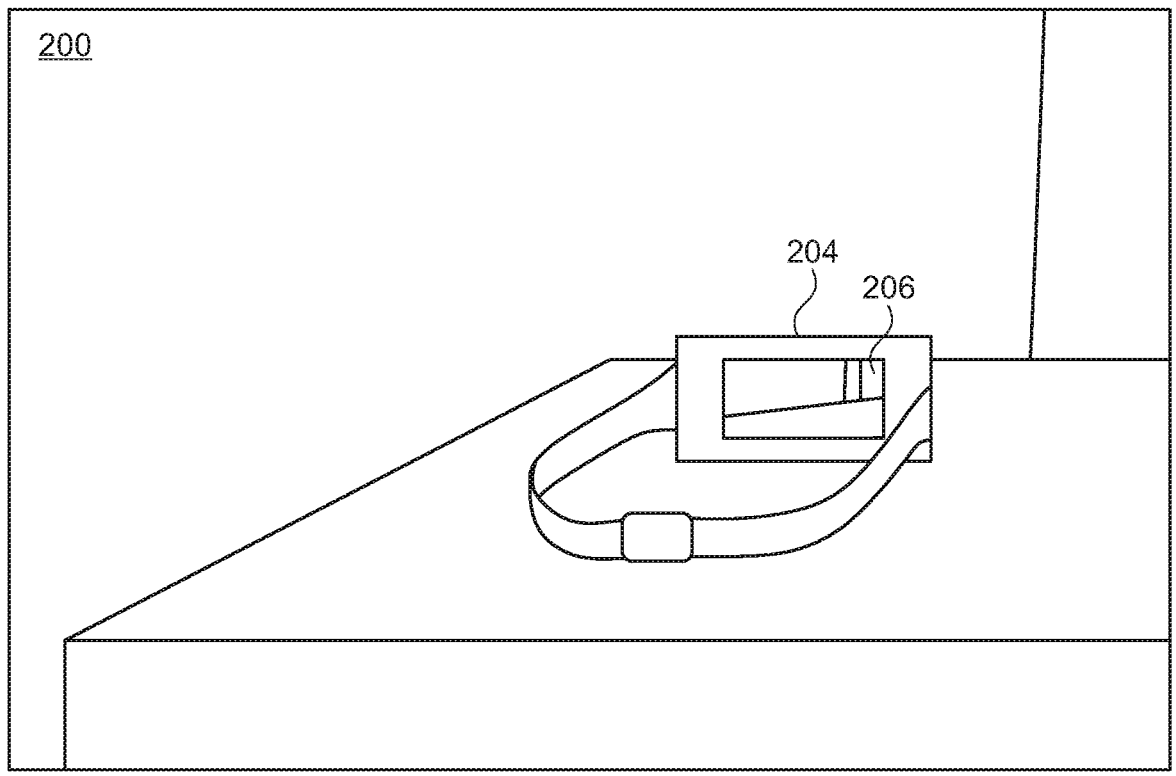

In some embodiments, while electronic device 204 is in the first orientation, a display 206 of electronic device 204 is in an off state, as shown in FIG. 2B (e.g., because electronic device 204 is in an off state or because electronic device 204 is in an inactive state, such as in sleep mode or reserve battery mode). In some embodiments, the first orientation is an orientation that does not correspond to a type of preferred orientation of electronic device 204. An orientation of electronic device 204 that corresponds to a preferred orientation is discussed in greater detail below. In some embodiments, while electronic device 204 is in the first orientation, display 206 of electronic device 204 is in an on state, as shown in FIG. 2C. In some embodiments, while display 206 is in an on state and electronic device 204 is in the first orientation, display 206 of electronic device 204 is displaying, on display 206, a pass-through video of physical environment 200.

Figure 2D:
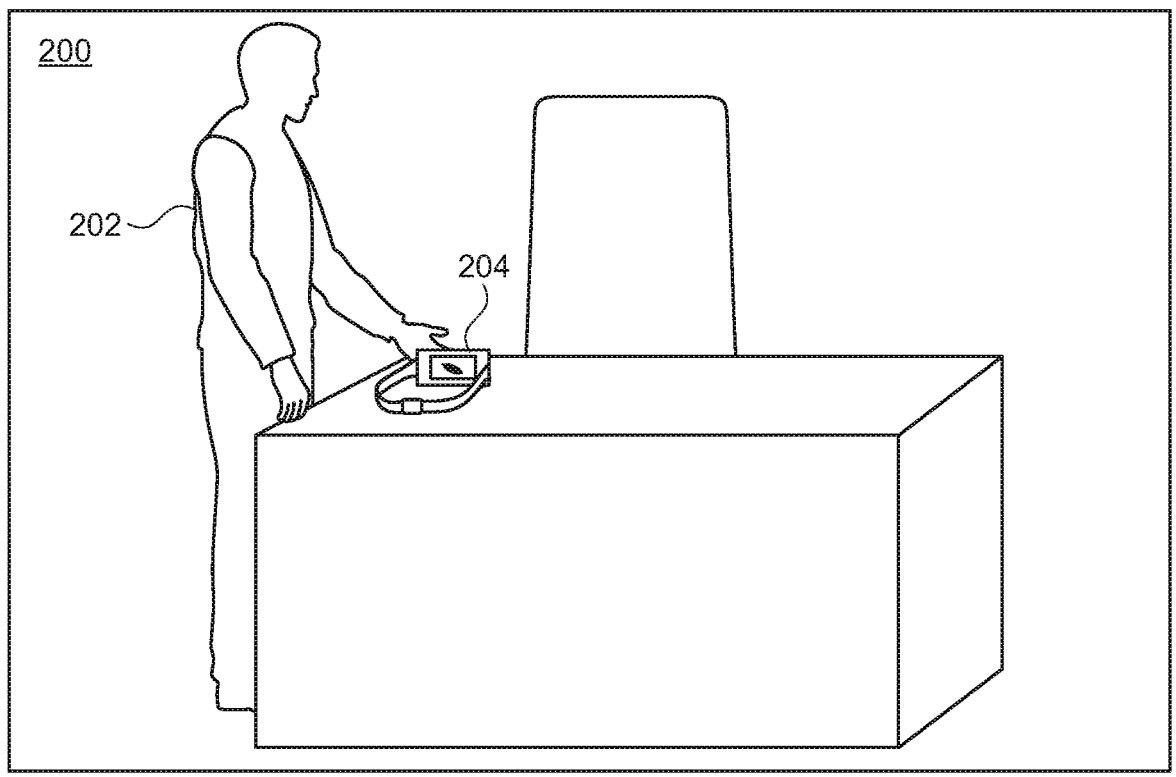
Figure 2E:
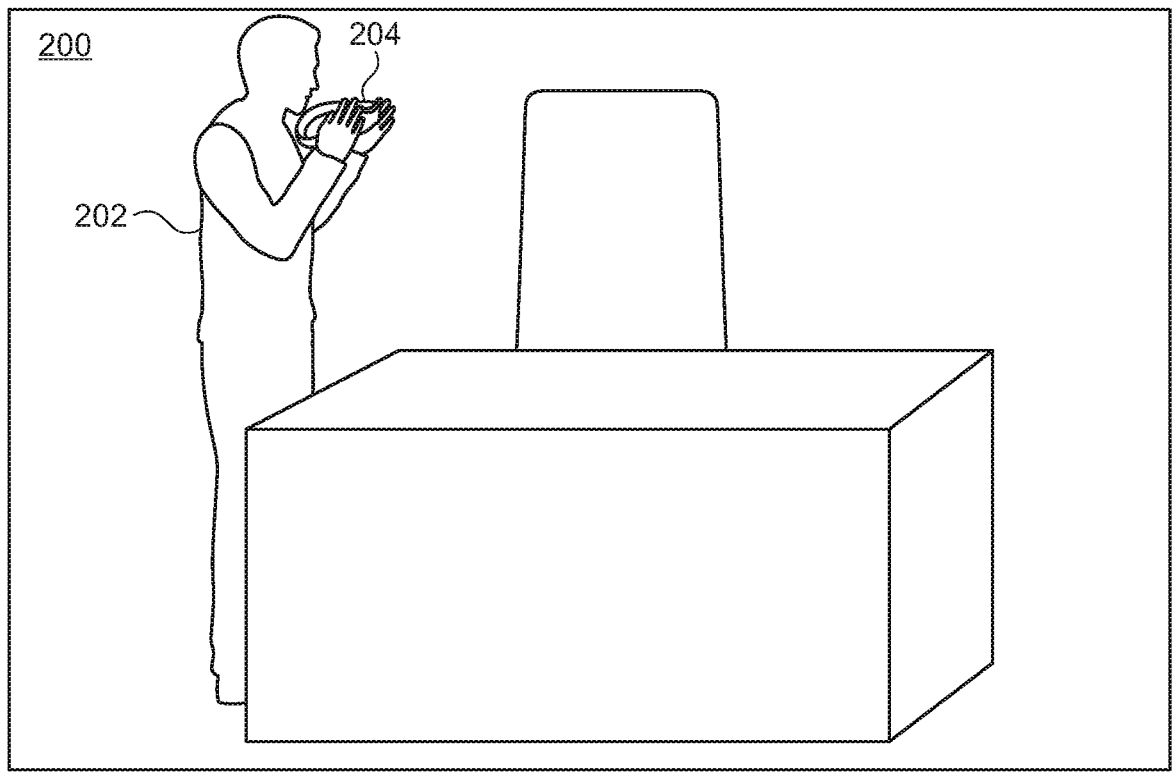
Figure 2F:
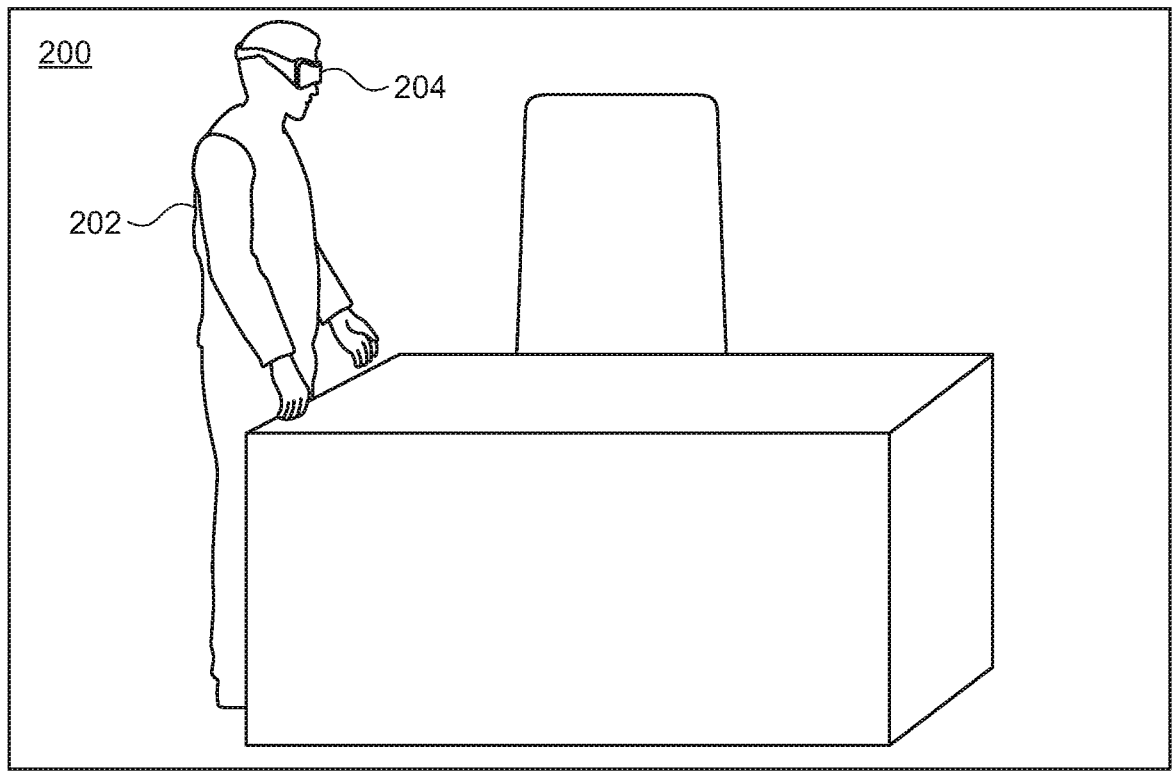

FIGS. 2D-2F illustrate electronic device 204 being moved, by user 202, from the first orientation (e.g., as shown in FIG. 2D) to a second orientation (e.g., a second position, a second location, and/or a second placement of electronic device 2040 within physical environment 200, as shown in FIG. 2F). In some embodiments, the second orientation is an orientation that corresponds to a type of preferred orientation of electronic device 204, where a preferred orientation corresponds to a particular position, location, and/or placement of electronic device 204 within physical environment 200 that, when detected or determined by electronic device 204 that it is in the preferred orientation, causes electronic device 204 to transition to displaying a computer-generated reality environment, as described in greater detail below. In some embodiments, the second orientation corresponds to user 202 wearing electronic device 204 (e.g., on the head of the user, as shown in FIG. 2F). In some embodiments, the second orientation corresponds to an orientation of electronic device 204 when electronic device 204 determines that the user is in the motion of wearing electronic device 204 (e.g., as shown FIG. 2E).

In some embodiments, display 206 of electronic device 204 remains in the off state while electronic device 204 is being moved from the first orientation to the second orientation. In some embodiments, display 206 of electronic device 204 continues displaying, on display 206, the pass-through video of physical environment 200 while electronic device 204 is being moved from the first orientation to the second orientation.

Figure 2G:
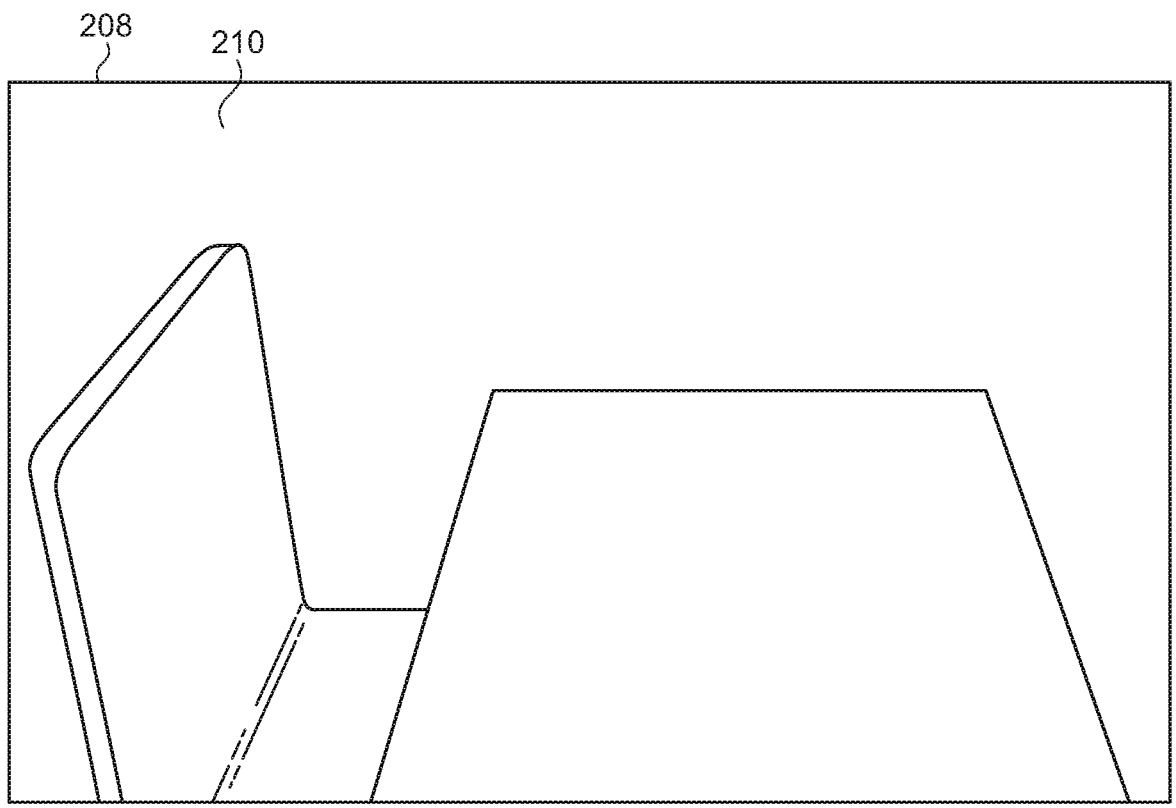

FIG. 2G illustrates display 206 of electronic device 204 upon electronic device 204 detecting that it is moved to the second orientation. In some embodiments, in response to detecting (e.g., using one or more sensors of electronic device 204, such as an accelerometer(s) and/or gyrometer(s)) movement from the first orientation to the second orientation, and in accordance with a determination that display 206 was in an off state (e.g., as in FIG. 2B), electronic device 204 turns on display 206 and displays, on display 206, a video 208. In some embodiments, video 208 is a pass-through video of physical environment 200. In some embodiments, in response to detecting movement from the first orientation to the second orientation, and in accordance with a determination that display 206 was in an on state (e.g., as in FIG. 2C), electronic device 204 continues displaying the pass-through video of physical environment as video 208.

Figure 2H:
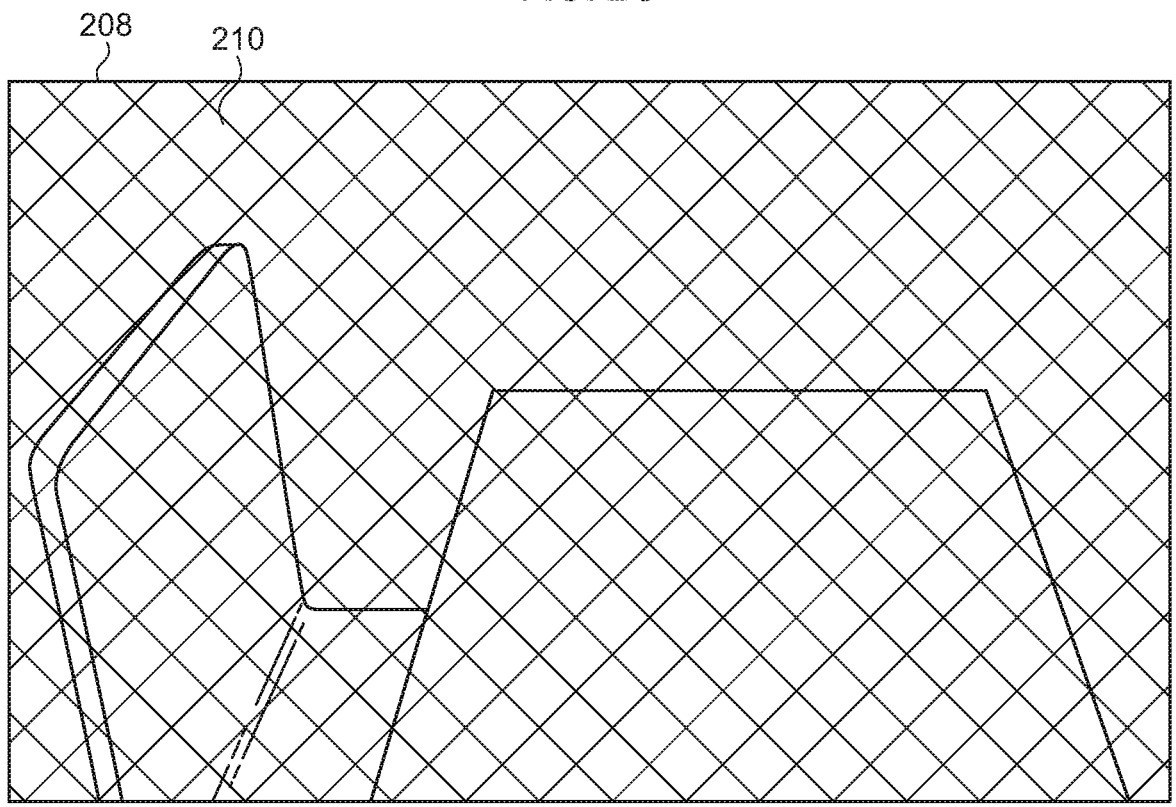
Figure 2I:
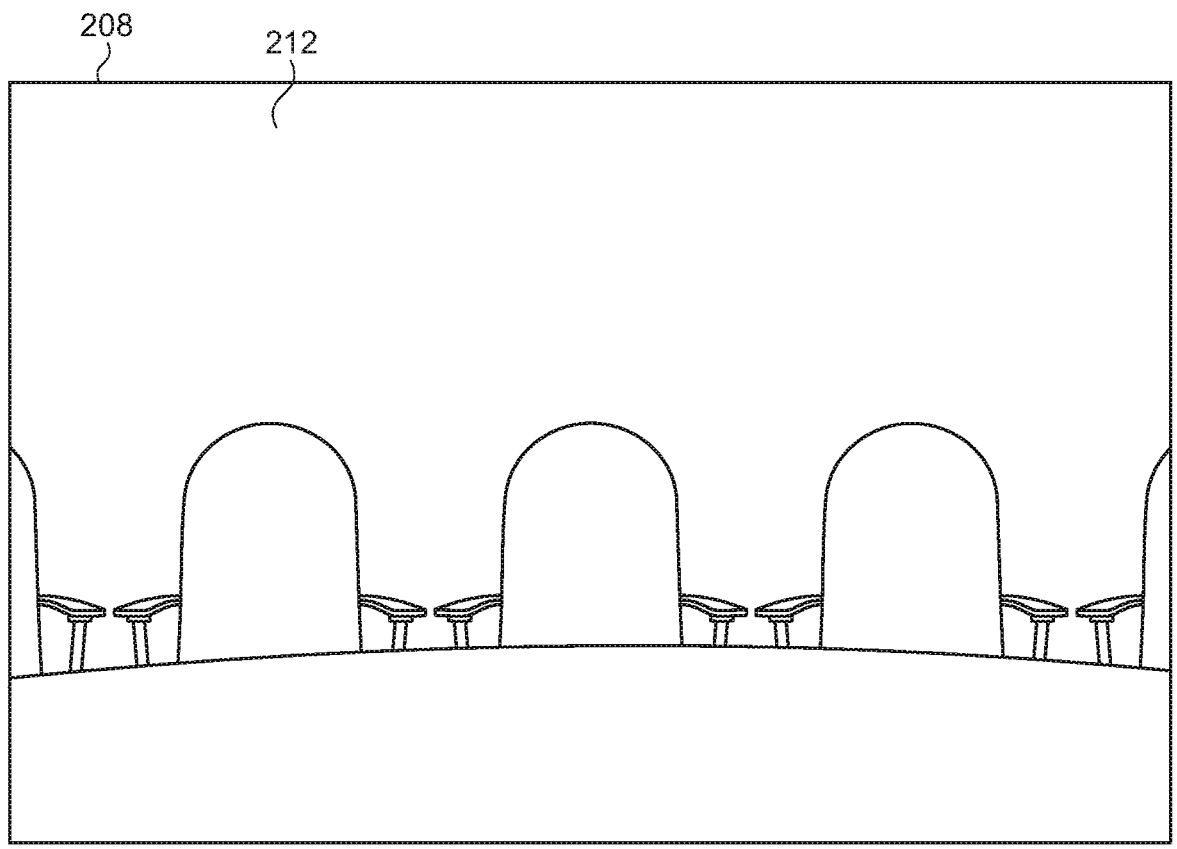

FIGS. 2G-2I illustrate electronic device 204 displaying, on display 206, a transition from displaying video 208 (e.g., corresponding to a pass-through video of physical environment 200), as shown in FIG. 2G, to displaying a computer-generated reality environment 210 (e.g., a conference room), as shown in FIG. 2I, in response to detecting that electronic device 204 is now at the second orientation. In other words, electronic device 204 detecting that it is moved from the first orientation (e.g., as shown in FIG. 2D) to the second orientation (e.g., as shown in FIG. 2F) triggers electronic device 204 to display the transition from displaying video 208 to displaying computer-generated reality environment 210.

In some embodiments, if display 206 of electronic device 204 was in an off state at the first orientation (e.g., as shown in FIG. 2B), electronic device 204 activates display 206 and displays, on display 206, a transition to computer-generated reality environment 210 in response to detecting movement from the first orientation to the second orientation without first displaying video 208.

In some embodiments, the transition from displaying video 208 (e.g., corresponding to a pass-through video of physical environment 200) to displaying computer-generated reality environment 210 comprises phasing out (e.g., gradually darkening or blurring, as shown in FIG. 2H) video 208 from display 206 such that video 208 is increasingly less visible on display 206 until it is no longer visible on display 206. In some embodiments, the transition from displaying video 208 (e.g., corresponding to a pass-through video of physical environment 200) to displaying computer-generated reality environment 210 further comprises, subsequent to or while phasing out video 208, phasing in (e.g., gradually brightening and/or sharpening) computer-generated reality environment 210 such that computer-generated reality environment 210 is increasingly visible on display 206 until it is fully visible on display 206.

In some embodiments, electronic device 204 also outputs, via one or more speakers of electronic device 204, audio that corresponds to the transition concurrently while displaying the transition from video 208 to computer-generated reality environment 210. In some embodiments, the audio that corresponds to the transition is at least partly based on sound that is captured by a microphone of electronic device 204 during the transition (e.g., a pass-through audio).

In some embodiments, a type and/or characteristic of the transition to displaying computer-generated reality environment 210 is at least partly based on data (e.g., real-world context data) from the physical environment (e.g., physical environment 200) that is captured and/or detected by electronic device 204, where the data relate to real-world conditions surrounding electronic device 204 and/or that are relevant to user 202 using electronic device 204 (e.g., brightness level, background noise level, location, climate), as described in greater detail below. In some embodiments, electronic device 204 detects data from the physical environment (e.g., physical environment 200) in response to detecting that electronic device 204 is moved to the second orientation (e.g., as shown in FIG. 2F). One benefit of detecting the data from the physical environment in response to detecting that electronic device 204 is at the second orientation, as opposed to continuously or periodically detecting the data prior to detecting that electronic device 204 is at the second orientation, is lowering energy consumption by electronic device 204.

In some embodiments, the data (e.g., real-world context data) from the physical environment (e.g., physical environment 200) that relate to real-world conditions surrounding electronic device 204 and/or that are relevant to user 202 using electronic device 204 include a brightness level of ambient lighting of the area or region surrounding electronic device 204 within the physical environment (e.g., detected via a light sensor of electronic device 204). In some embodiments, electronic device 204 determines and adjusts a brightness level and/or changes in the brightness level of the transition based on the detected brightness level of the ambient lighting. For example, if electronic device 204 detects that physical environment 200 has a low brightness level (e.g., a brightness level that is below a predetermined threshold), electronic device 204 displays video 208 with a low brightness level and increases (e.g., gradually, over the course of the transition) the brightness level during the transition from video 208 to computer-generated reality environment 210.

In some embodiments, the data (e.g., real-world context data) from the physical environment (e.g., physical environment 200) that relate to real-world conditions surrounding electronic device 204 and/or that are relevant to user 202 using electronic device 204 include a background noise level of the area or region surrounding electronic device 204 within the physical environment (e.g., detected via a mic of electronic device 204). In some embodiments, electronic device 204 determines and adjusts a volume of the audio output corresponding to the transition based on the detected background noise level. For example, if electronic device 204 detects that physical environment 200 has a low background noise level, electronic device 204 maintains a low volume for the audio output or increases (e.g., gradually, over the course of the transition) the volume of the audio output from a low volume to a higher volume.

In some embodiments, the data (e.g., real-world context data) from the physical environment (e.g., physical environment 200) that relate to real-world conditions surrounding electronic device 204 and/or that are relevant to user 202 using electronic device 204 include a current location of electronic device 204 (e.g., detected via a location sensor and/or GPS of electronic device 204). In some embodiments, electronic device 204 selects one or more images (e.g., a slideshow of images) based on the detected location and displays, during the transition from video 208 to computer-generated reality environment 210, the one or more images. For example, if electronic device 204 detects that physical environment 200 is an indoor environment, electronic device 204 selects one or more images (e.g., one or more stock images retrieved from a server) of indoor locations (e.g., an image of an office, a room, a hallway) to be displayed during the transition.

In some embodiments, the data (e.g., real-world context data) from the physical environment (e.g., physical environment 200) that relate to real-world conditions surrounding electronic device 204 and/or that are relevant to user 202 using electronic device 204 include current climate information (e.g., weather, temperature, and/or humidity level) of the physical environment (e.g., detected by one or more sensors (e.g., one or more temperature/humidity sensors) and/or obtained from a remote server (e.g., weather information about the user's current location obtained via the web)). In some embodiments, electronic device 204 selects one or more images based on the detected climate information and displays, during the transition from video 208 to computer-generated reality environment 210, the selected images. For example, if electronic device 204 detects that physical environment 200 is hot and dry, electronic device 204 selects one or more images relevant to a hot and/or humid climate (e.g., an image of the sun) to be displayed during the transition.

In some embodiments, the data (e.g., real-world context data) from the physical environment (e.g., physical environment 200) that relate to real-world conditions surrounding electronic device 204 and/or that are relevant to user 202 using electronic device 204 include a person that is together with the user in the physical environment. In some embodiments, if video 208 corresponds to a pass-through video, electronic device 204 displays, in video 208, a representation of the person while the person is within the field-of-view of electronic device 204. In some embodiments, electronic device 204 maintains display of the representation of the person during the transition from video 208 to computer-generated reality environment 210. In some embodiments, the representation of the person changes (e.g., gradually, over the course of the transition) to an avatar corresponding to the person during the transition from video 208 to computer-generated reality environment 210.

In some embodiments, the length and/or rate (e.g., how fast a slideshow of images are being shown) of the transition from video 208 to computer-generated reality environment 210 is at least partly based on a degree of similarity between video 208 and computer-generated reality environment 210. For example, if video 208 corresponds to a pass-through video of the physical environment, where the physical environment is an office (e.g., physical environment 200), and computer-generated reality environment 210 corresponds to a conference room, electronic device 204 determines that video 208 and computer-generated reality environment 210 are similar and displays the transition for a first predetermined amount of time (e.g., 1 second, 2 seconds). For another example, if video 208 corresponds to a pass-through video of the physical environment, where the physical environment is an office (e.g., physical environment 200), and computer-generated reality environment 210 corresponds to an outdoor area (e.g., a forest, a beach, a city street), electronic device 204 determines that video 208 and computer-generated reality environment 210 are dissimilar and displays the transition for a second predetermined amount of time (e.g., 4 seconds, 5 seconds) that is longer than the first predetermined amount of time.

Figure 3:
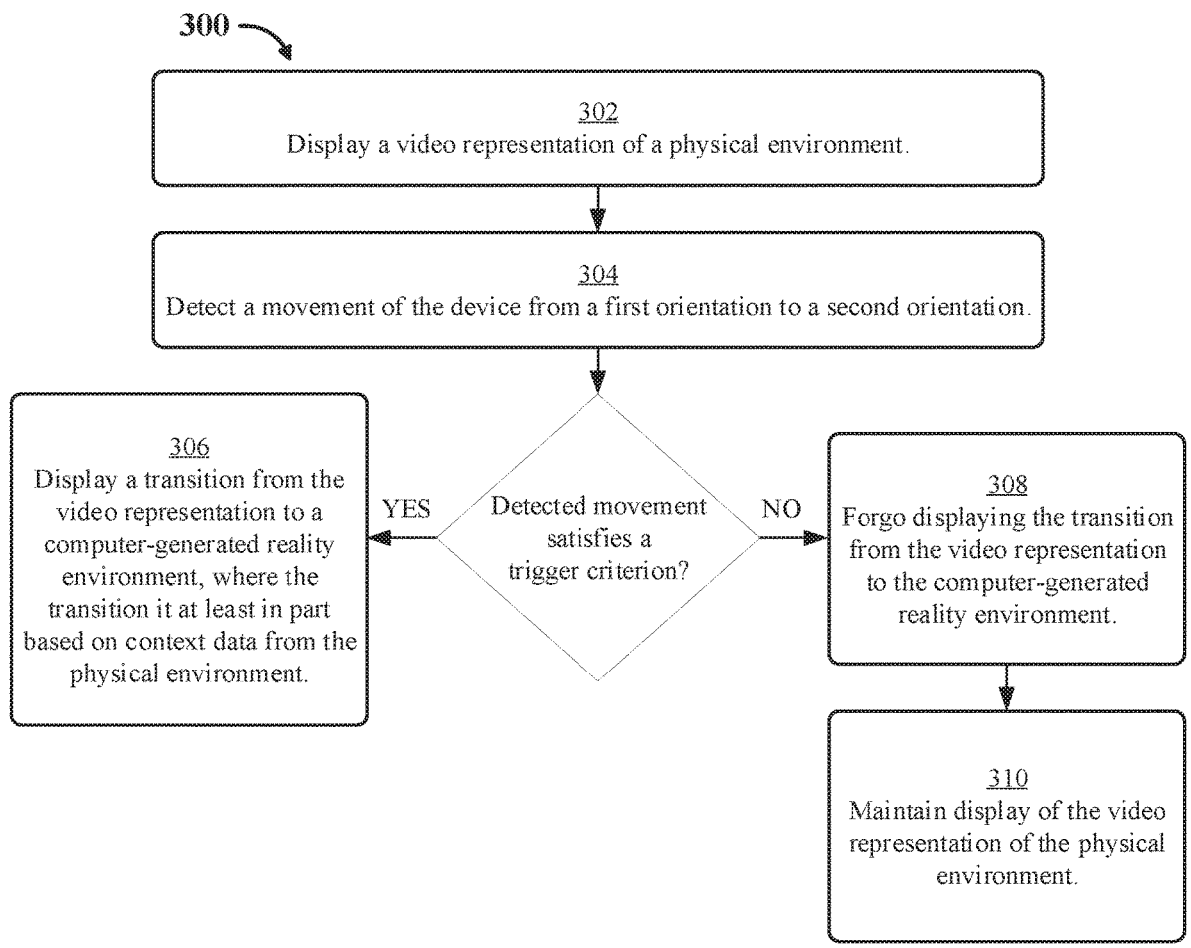
FIG. 3 is as flow diagram illustrating a method for transitioning from the physical environment to a computer-generated reality environment on a wearable electronic device, in accordance with some embodiments.

FIG. 3 is as flow diagram illustrating a method for transitioning from a physical environment to a computer-generated reality environment on a wearable electronic device, in accordance with some embodiments. Method 300 is performed at a wearable electronic device (e.g., a head-mounted device) that includes a display and one or more sensors (e.g., one or more images sensors and/or cameras, such as a front-facing camera and/or a downward-facing camera, an accelerometer, a light sensor, a microphone, a location sensor, such as a global positioning system (GPS) sensor).

The wearable electronic device (e.g., 204) displays (302), on the display (e.g., 206), a video representation (e.g., 208) of a physical environment (e.g., 200). In some embodiments, the wearable electronic device (e.g., 204) is a head-mounted device.

In some embodiments, the video representation (e.g., 208) of the physical environment (e.g., 200) comprises images corresponding to a field-of-view of a user (e.g., 202) of the wearable electronic device (e.g., 204) captured by a front-facing camera of the wearable electronic device.

The wearable electronic device (e.g., 204) detects (304), using the one or more sensors, a movement of the wearable electronic device from a first orientation to a second orientation that is different from the first orientation.

In some embodiments, prior to detecting the movement of the wearable electronic device (e.g., 204) from the first orientation to the second orientation, the wearable electronic device forgoes displaying the video representation (e.g., 208) of the physical environment (e.g., 200). In some embodiments, the wearable electronic device (e.g., 204) displays, on the display (e.g., 206), the video representation (e.g., 208) of the physical environment (e.g., 200) in response to detecting the movement of the wearable electronic device from the first orientation to the second orientation.

In response to detecting the movement of the wearable electronic device (e.g., 204) from the first orientation to the second orientation, in accordance with a determination that the detected movement satisfies a trigger criterion, the wearable electronic device displays (306), on the display (e.g., 206), a transition from the video representation (e.g., 208) of the physical environment (e.g., 200) to a computer-generated reality environment (e.g., 210), where the transition is at least in part based on context data detected from the physical environment.

In some embodiments, the detected movement satisfies the trigger criterion when the first orientation corresponds to an orientation in which the wearable electronic device (e.g., 204) is not being worn by a user (e.g., 202) of the wearable electronic device, and the second orientation corresponds to an orientation in which the wearable electronic device is being worn by the user of the wearable electronic device.

In some embodiments, the detected movement satisfies the trigger criterion when the movement of the wearable electronic device (e.g., 204) from the first orientation to the second orientation comprises an upwards movement of the wearable electronic device form the first orientation to the second orientation by at least a predetermined distance.

In some embodiments, in response to detecting the movement of the wearable electronic device (e.g., 204) from the first orientation to the second orientation, in accordance with a determination that the detected movement does not satisfy the trigger criterion, the wearable electronic device forgoes displaying (308), on the display (e.g., 206), the transition from the video representation (e.g., 208) of the physical environment (e.g., 200) to the computer-generated reality environment (e.g., 210). In some embodiments, in response to detecting the movement of the wearable electronic device (e.g., 204) from the first orientation to the second orientation, in accordance with a determination that the detected movement does not satisfy the trigger criterion, the wearable electronic device maintains display of (310) the video representation (e.g., 208) of the physical environment (e.g., 200).

In some embodiments, in response to detecting the movement of the wearable electronic device (e.g., 204) from the first orientation to the second orientation, the wearable electronic device detects, using the one or more sensors, the context data from the physical environment (e.g., 200).

In some embodiments, the context data detected from the physical environment (e.g., 200) includes a current time.

In some embodiments, the context data detected from the physical environment (e.g., 200) includes an ambient lighting level.

In some embodiments, the context data detected from the physical environment (e.g., 200) includes a current location of the wearable electronic device (e.g., 204).

In some embodiments, the context data detected from the physical environment (e.g., 200) includes changes in location of the wearable electronic device (e.g., 204).

In some embodiments, the context data detected from the physical environment (e.g., 200) includes an object identified in the video representation (e.g., 208) of the physical environment (e.g., 200). In some embodiments, displaying the transition from the video representation (e.g., 208) of the physical environment (e.g., 200) to the computer-generated reality environment (e.g., 210) includes maintaining display of the identified object in the transition.

In some embodiments, the context data detected from the physical environment (e.g., 200) includes a person identified in the video representation (e.g., 208) of the physical environment (e.g., 200). In some embodiments, displaying the transition from the video representation (e.g., 208) of the physical environment (e.g., 200) to the computer-generated reality environment (e.g., 210) includes displaying a transition of an image of the identified person in the video representation of the physical environment to an avatar of the identified person in the computer-generated reality environment.

In some embodiments, prior to displaying the transition from the video representation (e.g. 208) of the physical environment (e.g., 200) to the computer-generated reality environment (e.g., 210), the wearable electronic device (e.g., 204) generates, via a speaker of the wearable electronic device, a first type of audio output that is based on an ambient noise of the physical environment.

In some embodiments, while displaying the transition from the video representation (e.g., 208) of the physical environment (e.g., 200) to the computer-generated reality environment (e.g., 210), the wearable electronic device (e.g., 204) transitions from generating, via the speaker, the first type of audio output to a second type of audio output that is different from the first type of audio output, where the transition includes an adjustment of a volume of the audio output by an amount that is based on the ambient noise level of the physical environment.

FIGS. 4A-4G illustrate exemplary techniques for transitioning out of a computer-generated reality environment on electronic device 204. As mentioned above, in some embodiments, electronic device 204 is a wearable electronic device (e.g., a head-mounted device). As also mentioned above, in some embodiments, electronic device 204 is similar to electronic device 100a described above with reference to FIGS. 1A and 1B.

Figure 4A:
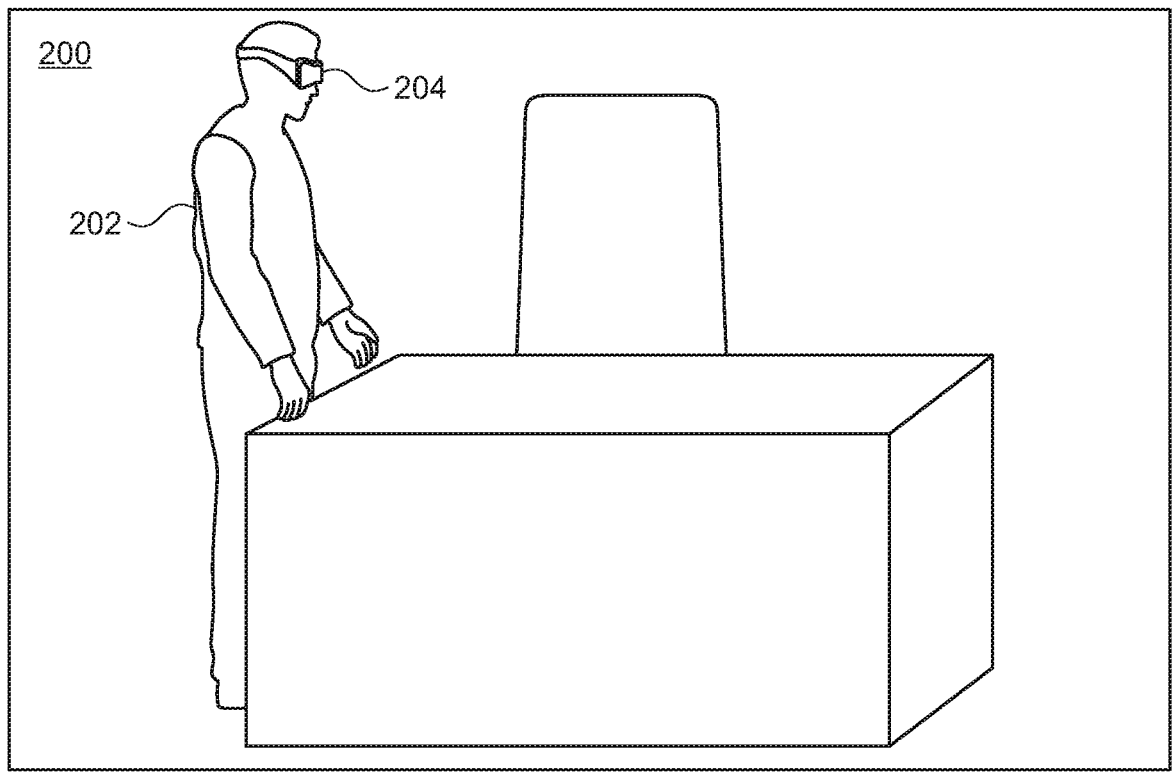
FIGS. 4A-4G illustrate exemplary techniques for transitioning out of a computer-generated reality environment on a wearable electronic device, in accordance with some embodiments.

FIG. 4A illustrates user 202 viewing computer-generated reality environment 210 using wearing electronic device 204 while in physical environment (e.g., as previously shown in FIG. 2F). In FIG. 4A, electronic device 204 is in the second orientation. As discussed, in some embodiments, the second orientation corresponds to user 202 wearing electronic device 204 (e.g., on the head of the user, as shown in FIG. 4A).

While displaying computer-generated reality environment 210, electronic device 204 detects a trigger event that causes electronic device 204 to display a transition out of computer-generated reality environment 204.

In some embodiments, displaying the transition out of computer-generated reality environment 204 comprises ceasing display of (e.g., gradually, over a predetermined amount of time) computer-generated reality environment 204 and, after displaying the transition out of the computer-generated reality environment, transitioning display 206 an inactive state or an off state. In some embodiments, displaying the transition displaying the transition out of computer-generated reality environment 210 comprises ceasing display of (e.g., gradually, over the course of the transition) computer-generated reality environment 204 and instead displaying (e.g., gradually, over the course of the transition) a pass-through video of the physical environment (e.g., physical environment 200).

Figure 4B:
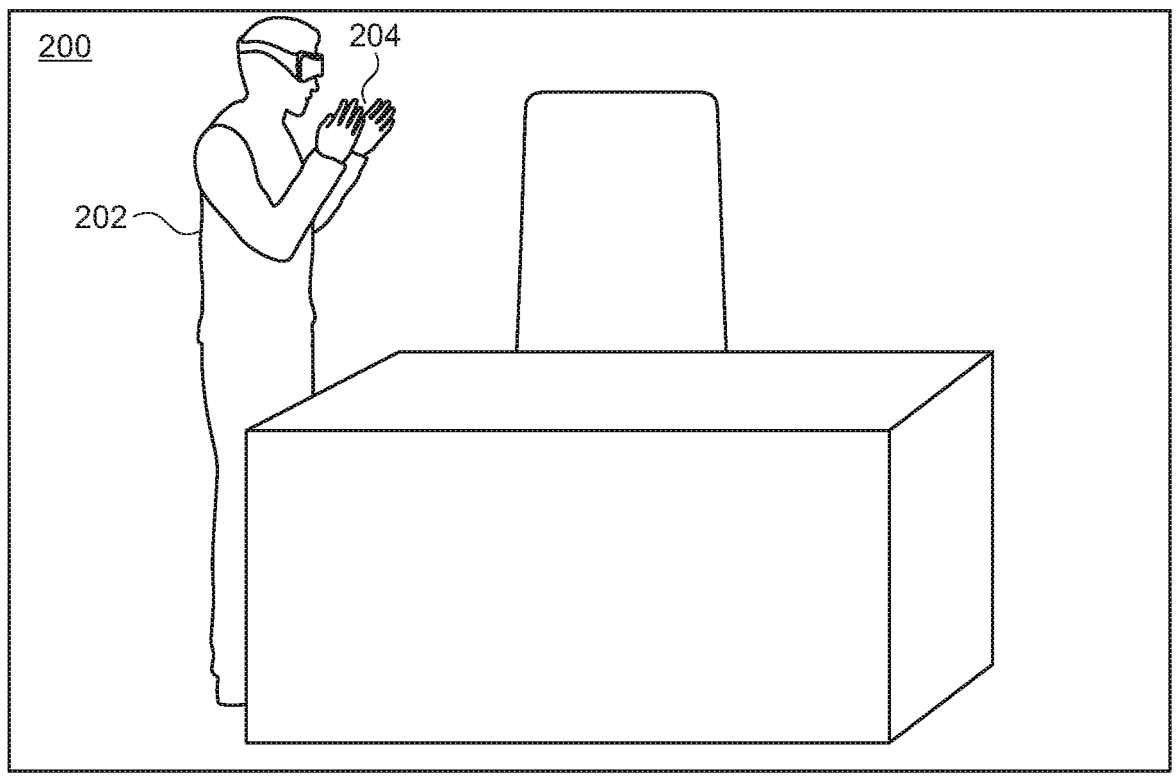
Figure 4C:
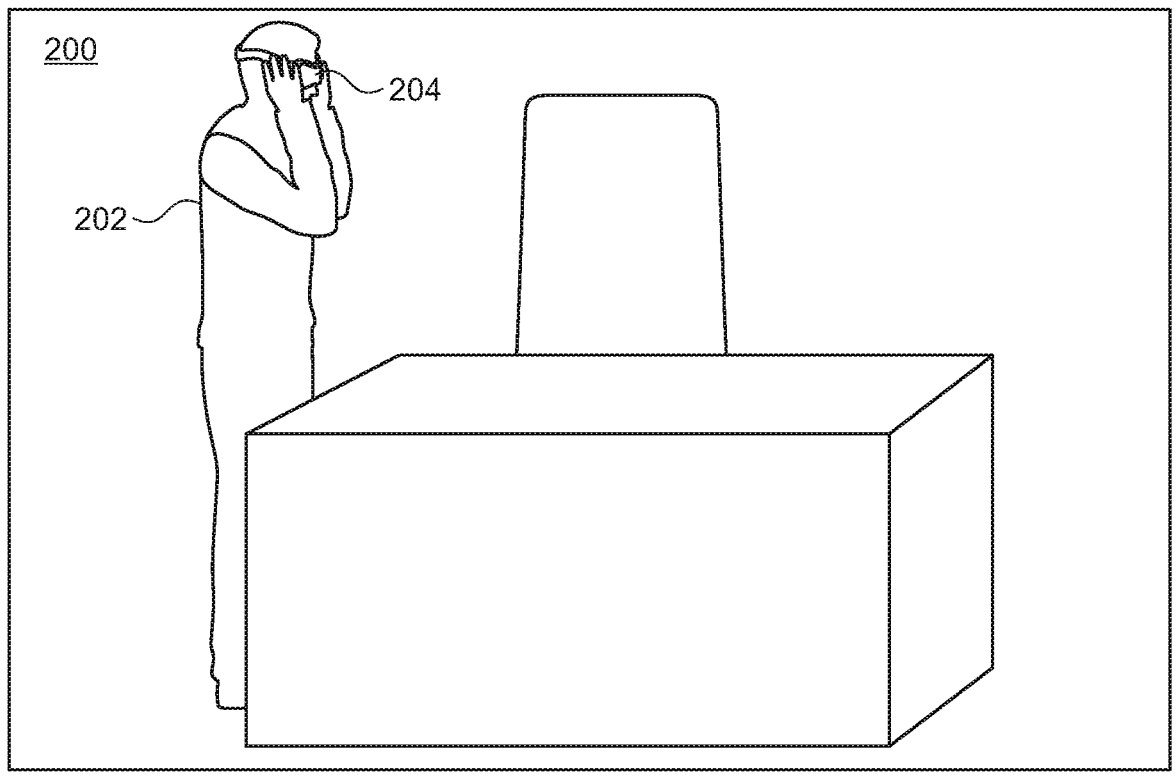

FIGS. 4B-4C illustrate one exemplary trigger event (e.g., a user-action event). In FIGS. 4B-4C, while displaying computer-generated reality environment 210, electronic device 204 detects, using one or more sensors of electronic device 204 (e.g., a downward-facing and/or forwarding facing camera or image sensor) a movement of user 202's hands and/or arms from a first position (e.g., a position that is below electronic device 204, a natural resting position by the user's sides) towards (e.g., upwards towards) electronic device 204 in order to take off electronic device 204. In some embodiments, in response to detecting the movement of user 202's hands and/or arms from the first position towards electronic device 204 to take off electronic device 204, electronic device 204 displays, on display 206, the transition out of computer-generated reality environment 210.

Figure 4D:
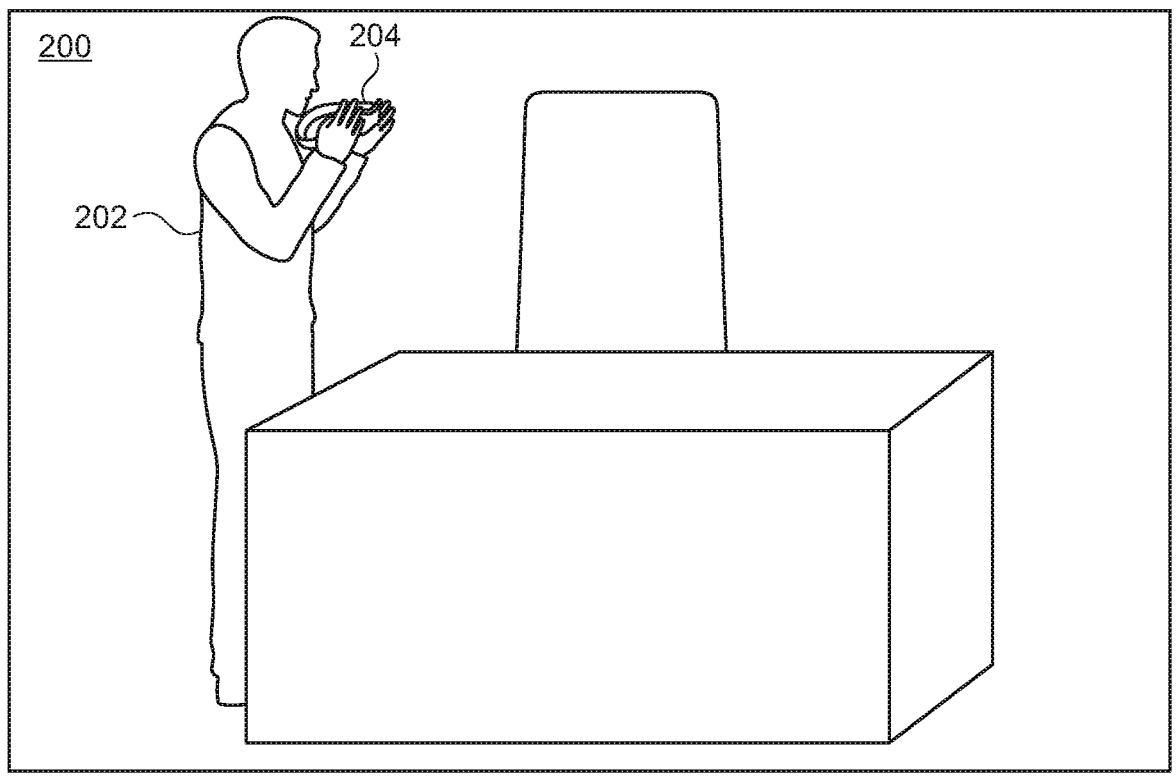

FIGS. 4C-4D illustrate another exemplary trigger event (e.g., an off-head event). In FIGS. 4C-4D, while displaying computer-generated reality environment 210, electronic device 204 detects, using one or more sensors of electronic device 204 (e.g., one or more motion sensors of electronic device 204, such as an accelerometer and/or a gyrometer), a movement of electronic device 204 from the second orientation (e.g., an orientation corresponding to user 202 wearing electronic device 204, as shown in FIG. 4C) to a third orientation different from the second orientation (e.g., an orientation that does not correspond to user 202 wearing electronic device 204, as shown in FIG. 4D). In some embodiments, the third orientation is an orientation that does not correspond to a type of preferred orientation of electronic device 204. In some embodiments, in response to detecting movement of electronic device 204 from the second orientation to the third orientation, electronic device 204 displays, on display 206, the transition out of computer-generated reality environment 210.

Figure 4E:
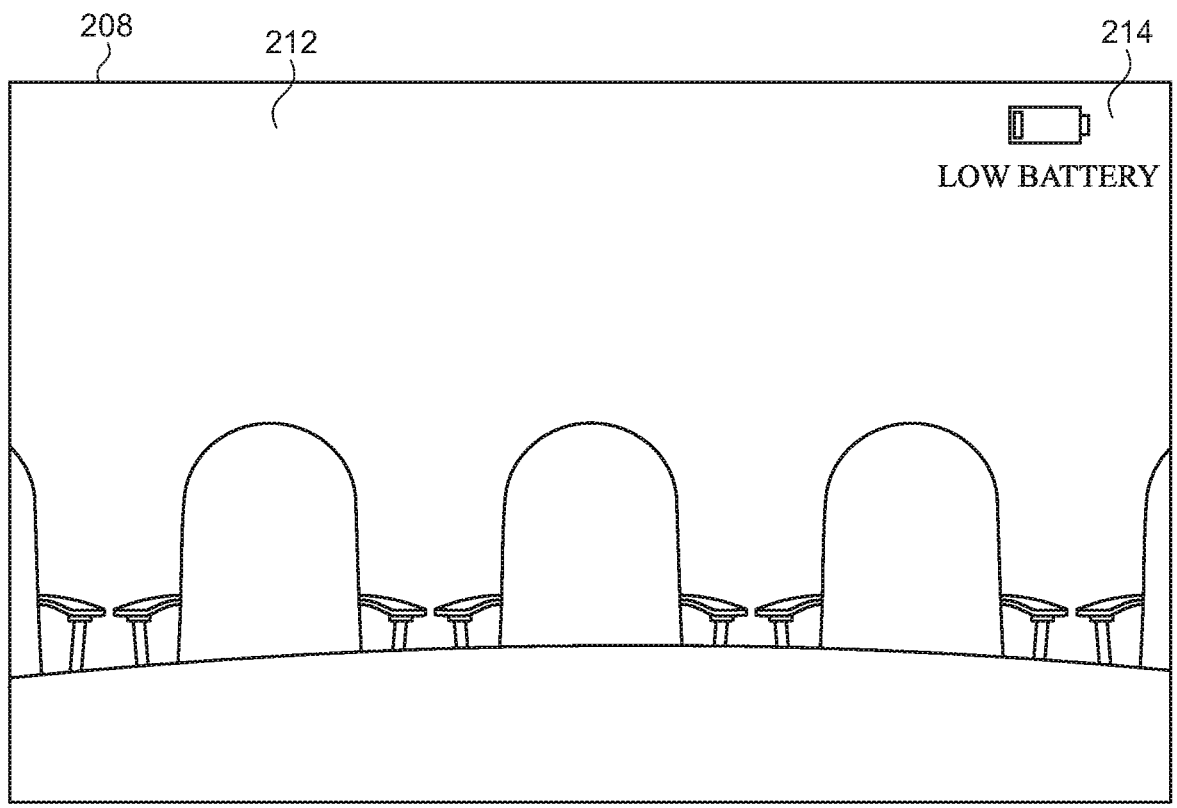

FIG. 4E illustrates another exemplary trigger event (e.g., a low battery event). In FIG. 4E, while displaying computer-generated reality environment 210, electronic device 204 detects that the remaining battery of electronic device 204 has reached or fallen below a threshold amount (e.g., 15%, 10%, 5%). In some embodiments, in response to detecting that the remaining battery has reached or fallen below the threshold amount, electronic device 204 displays, on display 206, a low battery indicator 212. In some embodiments, in response to detecting that the remaining battery has reached or fallen below the threshold amount, electronic device 204 further displays, on display 206, the transition out of computer-generated reality environment 210.

Figure 4F:
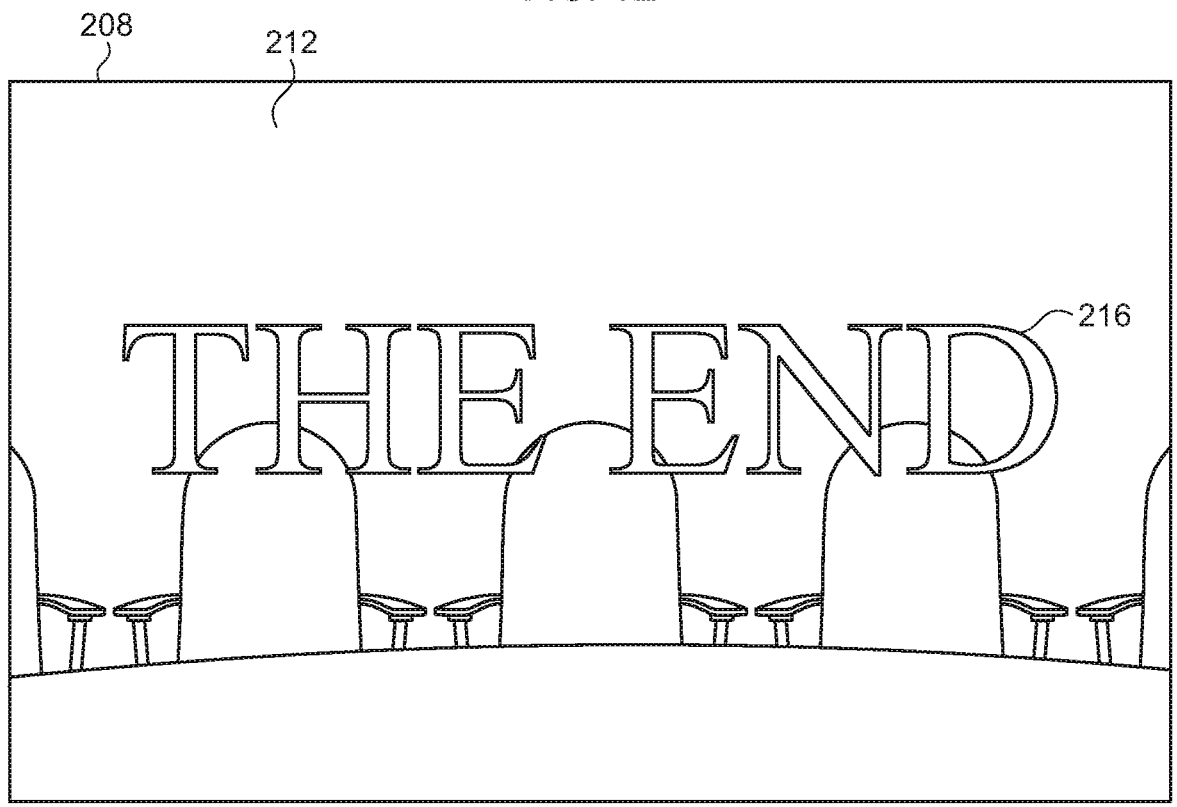

FIG. 4F illustrates another exemplary trigger event (e.g., an application-enforced event). In FIG. 4F, while displaying computer-generated reality environment 210, electronic device 204 determines (e.g., based on the application running the computer-generated reality environment) that computer-generated reality environment 210 or a current session of computer-generated reality environment 210 has ended (e.g., if computer-generated reality environment 400 is a movie that has a preset running time, electronic device 204 determines that the end of the movie's running time has been reached). In some embodiments, in response to determining that computer-generated reality environment 210 or the current session of computer-generated reality environment 210 has ended, electronic device 204 displays, on display 206, an end-of-session indicator 214. In some embodiments, in response to determining that computer-generated reality environment 210 or the current session of computer-generated reality environment 210 has ended, electronic device 204 further displays, on display 206, the transition out of computer-generated reality environment 210.

Figure 4G:
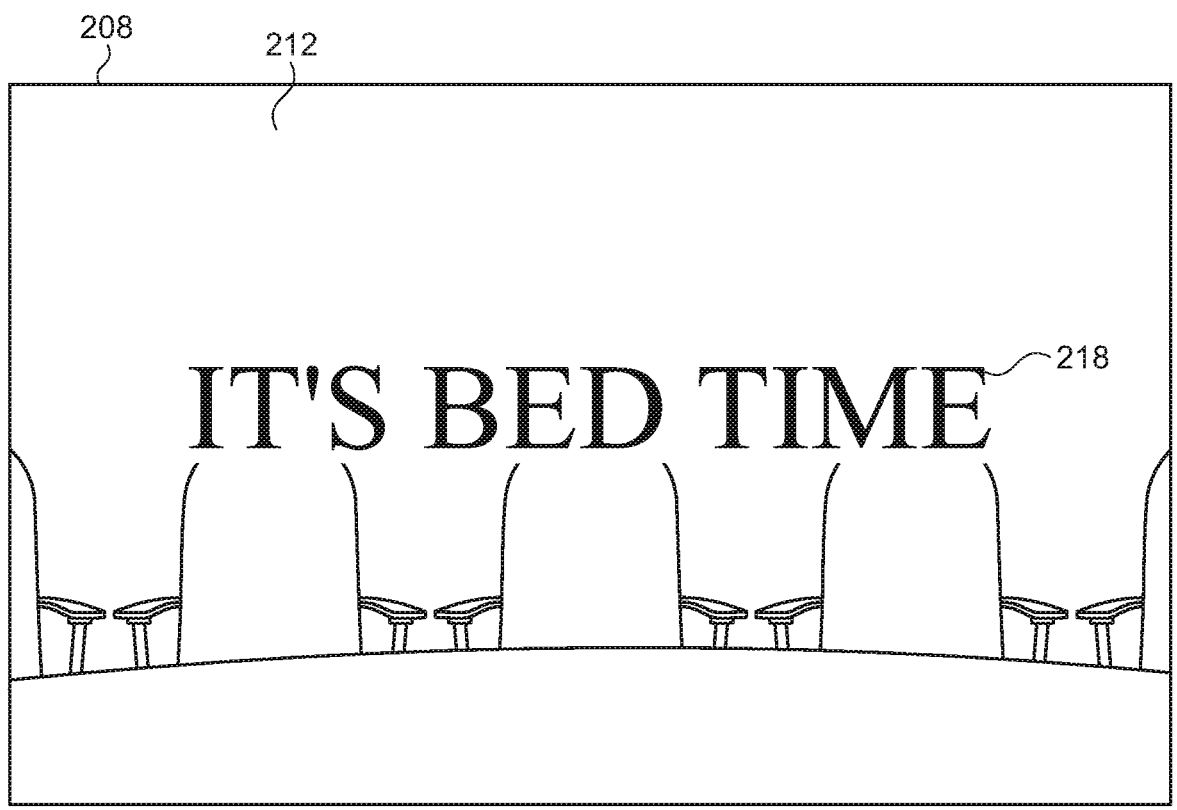

FIG. 4G illustrates another exemplary trigger event (e.g., a preset time event). In FIG. 4G, while displaying computer-generated reality environment 210, electronic device 204 detects that a preset time has been reached (e.g., a preset time by the user, such as the user setting a time for an alarm, bedtime, a time based on a scheduled calendar event from an electronic calendar linked to electronic device 204). In some embodiments, in response to detecting that a preset time has been reached, electronic device 204 displays, on display 206, a preset time indicator 216. In some embodiments, in response to detecting that a preset time has been reached, electronic device 204 further displays, on display 206, the transition out of computer-generated reality environment 210.

In some embodiments, electronic device 204 also outputs, via one or more speakers of electronic device 204, audio that corresponds to the transition concurrently while displaying the transition out of computer-generated reality environment 210. In some embodiments, the audio that corresponds to the transition is at least partly based on sound that is captured by a mic of electronic device 204 during the transition (e.g., a pass-through audio).

Figure 5:
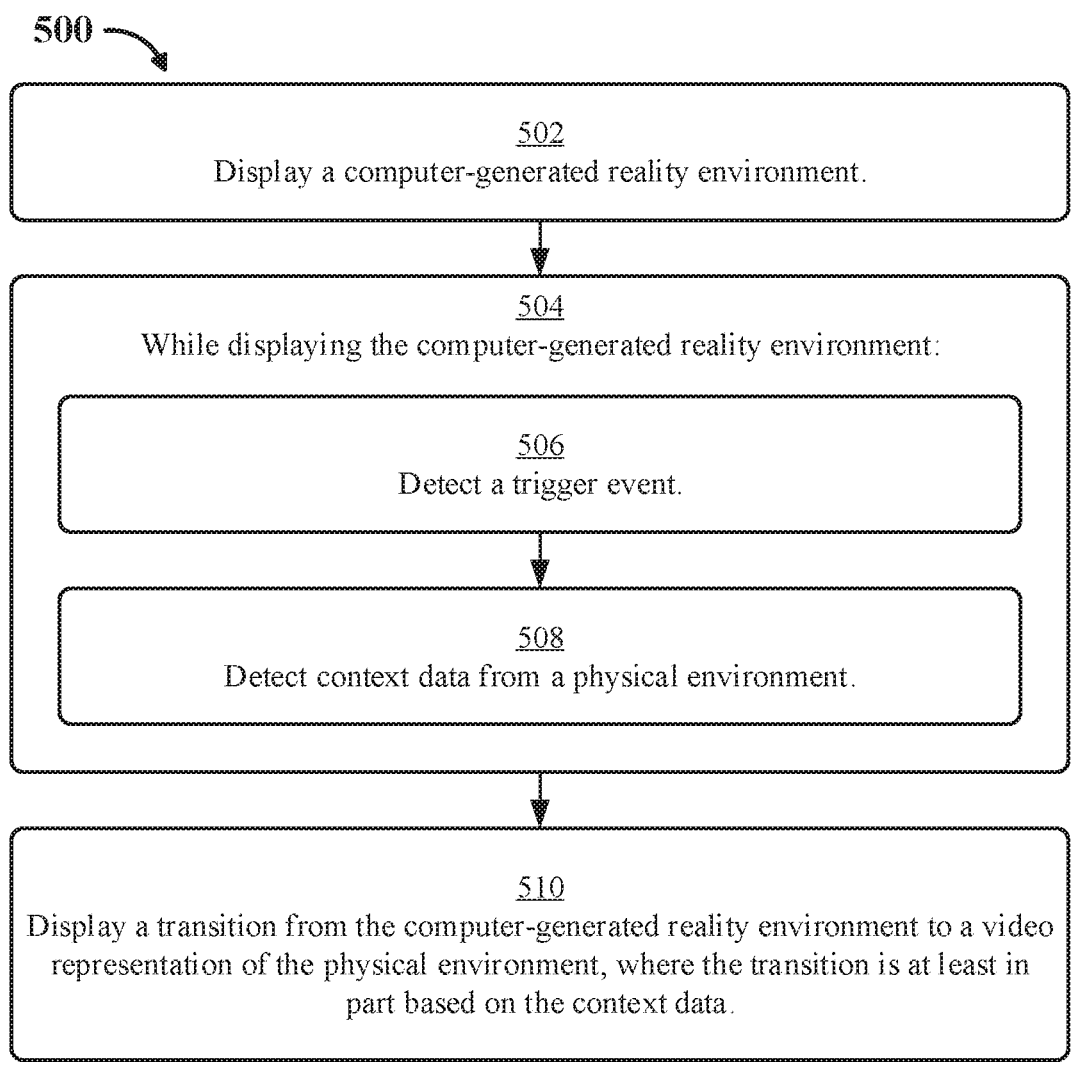
FIG. 5 is a flow diagram illustrating a method for transitioning out of a computer-generated reality environment on a wearable electronic device, in accordance with some embodiments.

FIG. 5 illustrates a flow diagram illustrating a method for transitioning out of a computer-generated reality environment on a wearable electronic device, in accordance with some embodiments. Method 500 is performed at a wearable electronic device (e.g., a head-mounted device) that includes a display and one or more sensors (e.g., one or more images sensors and/or cameras, such as a front-facing camera and/or a downward-facing camera, an accelerometer, a light sensor, a microphone, a location sensor, such as a GPS sensor).

The wearable electronic device (e.g., 204) displays (502), on the display (e.g., 206), a computer-generated reality environment (e.g., 210). In some embodiments, the wearable electronic device (e.g., 204) is a head-mounted device.

While displaying the computer-generated reality environment (e.g., 210) (504), the wearable electronic device (e.g., 204) detects (506), using the one or more sensors, a trigger event.

In some embodiments, the trigger event corresponds to a hand-raising movement detected by the one or more sensors of the wearable electronic device (e.g., 204).

In some embodiments, the wearable electronic device (e.g., 204) detecting the hand-raising movement comprises the wearable electronic device (e.g., 204) detecting, using the one or more sensors, including a downward-facing camera, an upward movement of a hand of a user (e.g., 202) of the wearable electronic device from a position below the wearable electronic device upwards towards the wearable electronic device.

In some embodiments, the trigger event corresponds to a movement of the wearable electronic device (e.g., 204) from a preferred orientation (e.g., an orientation corresponding to the user (e.g., 202) wearing or mounting the wearable electronic device) to a non-preferred orientation (e.g., an orientation corresponding to the user not wearing or mounting the wearable electronic device) detected by the one or more sensors of the wearable electronic device.

In some embodiments, the trigger event corresponds to the wearable electronic device (e.g., 204) reaching a predefined remaining battery amount (e.g., indicated by low battery indicator 212).

In some embodiments, the trigger event corresponds to an application-enforced instruction to cease display of the computer-generated reality environment (e.g., 210).

In some embodiments, the trigger event corresponds to a preset time.

While displaying the computer-generated reality environment (e.g., 210) (504), the wearable electronic device (e.g., 204) detects (508), using the one or more sensors, context data from a physical environment (e.g., 200).

The wearable electronic device (e.g., 204) displays (510), on the display (e.g., 206), a transition from the computer-generated reality environment (e.g., 210) to a video representation (e.g., 208) of the physical environment (e.g., 200), where the transition is at least in part based on the context data detected from the physical environment.

In some embodiments, displaying the transition from the computer-generated reality environment (e.g., 210) to the video representation (e.g., 208) of the physical environment (e.g., 200) includes shrinking at least a portion of the displayed transition towards a center region of the display (e.g., 206).

In some embodiments, while displaying the transition from the computer-generated reality environment (e.g., 210) to the video representation (e.g., 208) of the physical environment (e.g., 200), the wearable electronic device (e.g., 204) generates, via a speaker of the wearable electronic device, an audio output that transitions from an audio output corresponding to the computer-generated reality environment to an audio output that is at least in part based on the context data detected from the physical environment.

As described above, one aspect of the present technology is the gathering and use of data available from various sources to improve the effectiveness of the techniques for providing smooth transitions between the physical and computer-generated reality environments described herein. The present disclosure recognizes that the use of such personal information data, in the present technology, can be used to the benefit of users. For example, the personal information data can be used to determine and/or adjust the contents of the displayed transitions to and/or from computer-generated reality environments, as described herein.

Accordingly, use of such personal information enhances the effectiveness of the described technique in achieving its purpose of prevention users from experiencing the sudden jarring or unsettling sensations when entering and leaving a computer0-generated reality environment. Further, other uses for personal information data that benefit the user are also contemplated by the present disclosure. For instance, health and fitness data may be used to provide insights into a user's general wellness, or may be used as positive feedback to individuals using technology to pursue wellness goals.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the cause of the use of biometric information data to configure the smooth transition described herein, the present technology can be configured to allow users to select to "opt in" or "opt out" of participation in the collection of personal information data during registration for services or anytime thereafter. In another example, users can select which types of data can and cannot be used in configuring the smooth transition described herein. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, the smooth transitions described herein can be configured by inferring preferences based on non-personal information data or a bare minimum amount of personal information, such as information that can be accessed from the web and other publicly available information.

What is claimed is:

1. A wearable electronic device, comprising:
   a display;
   one or more sensors;
   one or more processors; and
   memory storing one or more programs configured to be executed by the one or more processors, the one or more programs including instructions for:
      displaying, on the display, a computer-generated reality environment;
      while displaying the computer-generated reality environment:
         detecting, using the one or more sensors, a trigger event; and
         detecting, using the one or more sensors, context data from a physical environment, wherein the context data from the physical environment includes at least one of:
            a current climate information corresponding to the physical environment;
            a presence of an additional user in the physical environment, wherein the additional user is distinct from a respective user of the wearable electronic device; and
            a determined similarity between the computer-generated reality environment and the physical environment; and
         in response to detecting the trigger event, displaying, on the display, a transition from the computer-generated reality environment to a video representation of the physical environment, wherein at least one visual effect displayed during the transition is at least in part based on the context data from the physical environment.

2. The wearable electronic device of claim 1, wherein displaying the transition from the computer-generated reality environment to the video representation of the physical environment includes shrinking at least a portion of the displayed transition towards a center region of the display.

3. The wearable electronic device of claim 1, wherein the wearable electronic device is a head-mounted device.

4. The wearable electronic device of claim 1, wherein the trigger event corresponds to a hand-raising movement detected by the one or more sensors of the wearable electronic device.

5. The wearable electronic device of claim 4, wherein detecting the hand-raising movement comprises:
   detecting, using the one or more sensors, including a downward-facing camera, an upward movement of a hand of a user of the wearable electronic device from a position below the wearable electronic device upwards towards the wearable electronic device.

6. The wearable electronic device of claim 1, wherein the trigger event corresponds to a movement of the wearable electronic device from a preferred orientation to a non-preferred orientation detected by the one or more sensors of the wearable electronic device.

7. The wearable electronic device of claim 1, wherein the trigger event corresponds to the wearable electronic device reaching a predefined remaining battery amount.

8. The wearable electronic device of claim 1, wherein the trigger event corresponds to an application-enforced instruction to cease display of the computer-generated reality environment.

9. The wearable electronic device of claim 1, wherein the trigger event corresponds to a preset time.

10. The wearable electronic device of claim 1, the one or more programs further including instructions for:
while displaying the transition from the computer-generated reality environment to the video representation of the physical environment:
generating, via a speaker of the wearable electronic device, an audio output that transitions from an audio output corresponding to the computer-generated reality environment to an audio output that is at least in part based on the context data detected from the physical environment.

11. A method, comprising:
at a wearable electronic device including a display and one or more sensors:
displaying, on the display, a computer-generated reality environment;
while displaying the computer-generated reality environment:
detecting, using the one or more sensors, a trigger event; and
detecting, using the one or more sensors, context data from a physical environment, wherein the context data from the physical environment includes at least one of:
a current climate information corresponding to the physical environment;
a presence of an additional user in the physical environment, wherein the additional user is distinct from a respective user of the wearable electronic device; and
a determined similarity between the computer-generated reality environment and the physical environment; and
in response to detecting the trigger event, displaying, on the display, a transition from the computer-generated reality environment to a video representation of the physical environment, wherein at least one visual effect displayed during the transition is at least in part based on the context data from the physical environment.

12. The method of claim 11, wherein displaying the transition from the computer-generated reality environment to the video representation of the physical environment includes shrinking at least a portion of the displayed transition towards a center region of the display.

13. The method of claim 11, wherein the wearable electronic device is a head-mounted device.

14. The method of claim 11, wherein the trigger event corresponds to a hand-raising movement detected by the one or more sensors of the wearable electronic device.

15. The method of claim 14, wherein detecting the hand-raising movement comprises:
detecting, using the one or more sensors, including a downward-facing camera, an upward movement of a hand of a user of the wearable electronic device from a position below the wearable electronic device upwards towards the wearable electronic device.

16. The method of claim 11, wherein the trigger event corresponds to a movement of the wearable electronic device from a preferred orientation to a non-preferred orientation detected by the one or more sensors of the wearable electronic device.

17. The method of claim 11, wherein the trigger event corresponds to the wearable electronic device reaching a predefined remaining battery amount.

18. The method of claim 11, wherein the trigger event corresponds to an application-enforced instruction to cease display of the computer-generated reality environment.

19. The method of claim 11, wherein the trigger event corresponds to a preset time.

20. The method of claim 11, further comprising:
while displaying the transition from the computer-generated reality environment to the video representation of the physical environment:
generating, via a speaker of the wearable electronic device, an audio output that transitions from an audio output corresponding to the computer-generated reality environment to an audio output that is at least in part based on the context data detected from the physical environment.

21. A non-transitory computer-readable storage medium storing one or more programs configured to be executed by one or more processors of a wearable electronic device including a display and one or more sensors, the one or more programs including instructions for:
displaying, on the display, a computer-generated reality environment;
while displaying the computer-generated reality environment:
detecting, using the one or more sensors, a trigger event; and
detecting, using the one or more sensors, context data from a physical environment, wherein the context data from the physical environment includes at least one of:
a current climate information corresponding to the physical environment;
a presence of an additional user in the physical environment, wherein the additional user is distinct from a respective user of the wearable electronic device; and
a determined similarity between the computer-generated reality environment and the physical environment; and
in response to detecting the trigger event, displaying, on the display, a transition from the computer-generated reality environment to a video representation of the physical environment, wherein at least one visual effect displayed during the transition is at least in part based on the context data from the physical environment.

22. The non-transitory computer-readable storage medium of claim 21, wherein displaying the transition from the computer-generated reality environment to the video representation of the physical environment includes shrinking at least a portion of the displayed transition towards a center region of the display.

23. The non-transitory computer-readable storage medium of claim 21, wherein the trigger event corresponds to one of:
- a hand-raising movement detected by the one or more sensors of the wearable electronic device;
- a movement of the wearable electronic device from a preferred orientation to a non-preferred orientation detected by the one or more sensors of the wearable electronic device;
- the wearable electronic device reaching a predefined remaining battery amount;
- to an application-enforced instruction to cease display of the computer-generated reality environment; and
- a preset time.

24. The non-transitory computer-readable storage medium of claim 23, wherein detecting the hand-raising movement comprises:
- detecting, using the one or more sensors, including a downward-facing camera, an upward movement of a hand of a user of the wearable electronic device from a position below the wearable electronic device upwards towards the wearable electronic device.

25. The non-transitory computer-readable storage medium of claim 21, the one or more programs further including instructions for:
- while displaying the transition from the computer-generated reality environment to the video representation of the physical environment:
  - generating, via a speaker of the wearable electronic device, an audio output that transitions from an audio output corresponding to the computer-generated reality environment to an audio output that is at least in part based on the context data detected from the physical environment.

* * * * *